US010700386B2

(12) United States Patent
Ofer et al.

(10) Patent No.: US 10,700,386 B2
(45) Date of Patent: Jun. 30, 2020

(54) ELECTRICALLY RESTORABLE RECHARGEABLE BATTERY, AND METHODS OF MANUFACTURE AND METHODS OF OPERATING THE BATTERY

(71) Applicant: CAMX Power LLC, Lexington, MA (US)

(72) Inventors: David Ofer, Needham, MA (US); Suresh Sriramulu, Arlington, MA (US)

(73) Assignee: CAMX POWER LLC, Lexington, MA (US)

( * ) Notice: Subject to any disclaimer, the term of this patent is extended or adjusted under 35 U.S.C. 154(b) by 325 days.

(21) Appl. No.: 15/793,675

(22) Filed: Oct. 25, 2017

(65) Prior Publication Data
US 2018/0115022 A1 Apr. 26, 2018

Related U.S. Application Data

(60) Provisional application No. 62/452,636, filed on Jan. 31, 2017, provisional application No. 62/412,327, filed on Oct. 25, 2016.

(51) Int. Cl.
*H01M 10/28* (2006.01)
*H01M 4/32* (2006.01)
(Continued)

(52) U.S. Cl.
CPC ....... *H01M 10/286* (2013.01); *H01M 2/1673* (2013.01); *H01M 2/18* (2013.01); *H01M 4/0435* (2013.01); *H01M 4/26* (2013.01); *H01M 4/32* (2013.01); *H01M 4/485* (2013.01); *H01M 4/525* (2013.01); *H01M 4/661* (2013.01);
(Continued)

(58) Field of Classification Search
None
See application file for complete search history.

(56) References Cited

U.S. PATENT DOCUMENTS

| 4,238,721 A | 12/1980 | Deluca et al. | |
| 6,228,516 B1 * | 5/2001 | Denton, III | H01M 4/602 429/122 |

(Continued)

OTHER PUBLICATIONS

"Johnson Controls expands global production of Start-Stop batteries" Press Release Downloaded http://www.johnsoncontrols.com/insights/2015/enterprise/feature/global-production-of-start-stop-batteries. Accessed Jan. 23, 2018.
(Continued)

*Primary Examiner* — Rena Dye Cronin
(74) *Attorney, Agent, or Firm* — Cantor Colburn LLP

(57) ABSTRACT

A battery system including: a lithium-ion cell including a positive electrode including a first metal oxide, an electrolyte, and a negative electrode including a second metal oxide having an electrochemical redox potential of 0.5 volt to 3 volts versus lithium; and an electrical circuit including a switchable component connecting the positive electrode and the negative electrode, wherein the switchable component provides a shunt between the positive electrode and the negative electrode in a first switch position, and wherein the electrical circuit is configured to provide a voltage of 0.1 volt or less between the positive electrode and the negative electrode when the switchable component is in the first switch position.

21 Claims, 10 Drawing Sheets

(51) Int. Cl.

| | | |
|---|---|---|
| *H01M 4/485* | (2010.01) | |
| *H01M 10/42* | (2006.01) | |
| *H01M 10/44* | (2006.01) | |
| *H01M 4/525* | (2010.01) | |
| *H01M 4/04* | (2006.01) | |
| *H01M 4/26* | (2006.01) | |
| *H01M 2/16* | (2006.01) | |
| *H01M 2/18* | (2006.01) | |
| *H01M 10/0525* | (2010.01) | |
| *H01M 4/66* | (2006.01) | |
| *H01M 4/02* | (2006.01) | |

(52) U.S. Cl.
CPC ....... *H01M 10/0525* (2013.01); *H01M 10/42* (2013.01); *H01M 10/44* (2013.01); *H01M 2004/021* (2013.01); *H01M 2004/027* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 6,596,439 | B1 | 7/2003 | Tsukamoto et al. |
| 8,637,184 | B2 | 1/2014 | Tsukamoto et al. |
| 8,673,505 | B2 | 3/2014 | Ohzuku et al. |
| 9,391,317 | B2 | 7/2016 | Ofer et al. |
| 2014/0197357 | A1 | 7/2014 | Ofer et al. |
| 2015/0050527 | A1 | 2/2015 | Jiang et al. |
| 2015/0086840 | A1* | 3/2015 | Takami ............... H01M 4/366 429/156 |
| 2015/0125753 | A1 | 5/2015 | Inagaki et al. |
| 2015/0132651 | A1* | 5/2015 | Lee ..................... H01M 4/131 429/220 |
| 2017/0170513 | A1* | 6/2017 | Sakamoto ............ H01M 4/525 |

OTHER PUBLICATIONS

Cava et al., "Lithium Insertion in Wadsley-Roth Phases Based on Niobium Oxide", J. Electrochem. Soc., Dec. 1983, p. 2345-2351.

Cava et al., "Secondary Lithium Cells Employing Vanadium Tungsten Oxide POsitive Electrodes", J. Electrochem. Soc., Jan. 1983, p. 243-245.

Cheng, Qiushi et al., "Bulk Ti2Nb10O29 as long-life and high-power Li-ion battery anodes", J. Mater. Chem., A, 2, 2014, p. 17258-17262.

Cho, S.G. et al., "Characteristic of LTO and LFP chemistry for 12V main power source and Start-stop vehicle (SSV) application", EIG Ltd., Mar. 22, 2016, p. 1-21.

Dahn, J.R., "Structure and electrochemistry of Li1+—yNiO2 and a new Li2NiO2 phase with the Ni(Oh)2 structure", Solid State Ionics, 44, 1990, p. 87-97.

Han, Jian-Tao et al., "New Anode Framework for Rechargeable Lithium Batteries", Chemisry of Materials, 2011, p. 1-3.

Helm, Jeff, "Value Proposition of Lithium Ion versus Pb-Acid for Military Vehicles", 46th Power Source 2014, p. 170-173.

Kang, Sun-Ho st al.., "Investigating the first-cycle irreversibility of lithium metal oxide cathodes for Li batteries", J. Mater. Sci, 2008, (43) p. 4701-4706.

Kruger, Franz Josef and Bernhart, Wolfgang, "Market and Technology for Low Voltage Automotive Battery Systems", 32nd Annual International Battery Seminar & Exhibit, Mar. 9-12, 2015 p. 1-25.

Lin et al., "Electronic Supplementary Information, TiNb6O17: A new electrode material for lithium-ion batteries", Electronic Supplementary Material (ESI) for ChemComm., 2015, P. 1-8.

Lin, Chunfu, et al., "ChemInform Abstract: TiNb6O17: A New Electrode Material for Lithium-Ion Batteries", Chem. Commun., 2015, 51 p. 8970-8973.

Mueller-Neuhaus J.R., et al., "Understanding Irreversible Capacity in LixNi1—yFeyO2 Cathode Materials", Journal of the Electrochemical Society, 147(1), 2000, p. 3598-3605.

Pillot, Christophe, "The Rechargeable Battery Market and Main Trends 2015-2025", International Battery SEminar & Exhibit, Mar. 21-24, 2016, p. 1-110.

Skalny, David, "Technical Challenges for Vehicle 14V/28V Lithium Ion Battery Replacement", Service Power Conference, 2011, Session 13, p. 1-19.

International Search Report; International Application No. PCT/US2018/016065; International Filing Date: Jan. 31, 2018; dated Apr. 13, 2018; 7 pages.

Ofer, D., et al., "CAM-7/LTO Lithium-Ion Cells for a 6T Battery with Excellent Low-Temperature Performance," 46th Power Sources Conference, Orlando, FL, Jun. 11, 2014, 24

Ofer, D., et al., "CAM-7/LTO Lithium-Ion Cells for Logistrically Robust, Damage-Tolerant Batteries," 2017 Joint Services Power Expo, Virginia Beach, VA, May 3, 2017, 30 pages.

Ofer, D., et al., "CAM-7/LTO Lithium-Ion Cells for Robust, High Power Batteries," 47th Power Sources Conference, Orlando, FL, Jun. 15, 2016, 24 pages.

Ofer, D., et al., "CAM-7/LTO Lithium-Ion Cells for Robust, High Power Batteries," Jun. 15, 2016, 4 pages.

Power and Mobility, "CAM-7/LTO Lithium-Ion Cells for Logistically Robust 6T Vehicle Batteries," CAMX Power LLC, Lexington, MA, National Defense Industrial Association, GVSETS, Aug. 10, 2017, 21 pages.

Written Opinion; International Application No. PCT/US2018/016065; International Filing Date: Jan. 31, 2018; dated Apr. 13, 2018; 6 pages.

* cited by examiner

ELECTRICALLY RESTORABLE RECHARGEABLE BATTERY, AND METHODS OF MANUFACTURE AND METHODS OF OPERATING THE BATTERY

CROSS-REFERENCE TO RELATED APPLICATION

This application claims the benefit of U.S. Provisional Patent Application Ser. No. 62/452,636, filed on Jan. 31, 2017, and U.S. Provisional Patent Application Ser. No. 62/412,327, filed on Oct. 25, 2017, the contents of which are incorporated herein by reference in their entirety.

GOVERNMENT LICENSE RIGHTS

This invention was made with government support under contract W56HZV-12-C-0065, awarded by the United States Army, and contract HQ0147-15-C-8003, awarded by the United States Defense Logistics Agency. The government has certain rights in the invention.

BACKGROUND

(1) Field

Disclosed is an electrically restorable rechargeable battery, methods of manufacture thereof, and methods of electrically restoring the rechargeable battery.

(2) Description of the Related Art

Lithium ion batteries are the primary power source for numerous small portable electronic devices for a variety of reasons, including the high energy density, high specific energy, and long cycle life associated with the technology. However, because of the sensitivity of commercially available lithium ion cells to over-discharge, because of concerns related to the safety of lithium ion batteries on storage, and other aspects, there remains a need for an improved lithium ion battery and methods of operating the same.

SUMMARY

Disclosed is a battery system including: a lithium-ion cell including a positive electrode including a first metal oxide, an electrolyte, and a negative electrode including a second metal oxide having an electrochemical redox potential of 0.5 volt to 3 volts versus lithium; and an electrical circuit including a switchable component connecting the positive electrode and the negative electrode, wherein the switchable component provides a shunt between the positive electrode and the negative electrode in a first switch position, and wherein the electrical circuit is configured to provide a voltage of 0.1 volt or less between the positive electrode and the negative electrode when the switchable component is in the first switch position.

Also disclosed is a method of restoring a battery, the method including: providing a battery including a lithium-ion cell including a positive electrode including a first metal oxide, an electrolyte, and a negative electrode including a second metal oxide having an electrochemical redox potential of 0.5 volt to 3 volts versus lithium; discharging the battery; and providing a shunt between the positive electrode and the negative electrode of the cell to restore the battery.

A method of manufacturing a battery system, the method including: connecting a lithium-ion cell to an electrical circuit to manufacture the battery, wherein the lithium-ion cell includes a positive electrode including a first metal oxide, an electrolyte, and a negative electrode including a second metal oxide having an electrochemical redox potential of 0.5 volt to 3 volts versus lithium, wherein the electrical circuit includes a switchable component connecting the positive electrode and the negative electrode, wherein the switchable component provides a shunt between the positive electrode and the negative electrode in a first switch position, and wherein the electrical circuit is configured to provide a voltage of 0.1 volt or less between the positive electrode and the negative electrode when the switchable component is in the first switch position.

Also disclosed is a vehicle including: an electric motor; and a battery system connected to the electric motor, wherein the battery system includes a lithium-ion cell including a positive electrode including a first metal oxide, an electrolyte, and a negative electrode including a second metal oxide having an electrochemical redox potential of 0.5 volt to 3 volts versus lithium, and an electrical circuit including a switchable component connecting the positive electrode and the negative electrode, wherein the switchable component provides a shunt between the positive electrode and the negative electrode in a first switch position, and wherein the electrical circuit is configured to provide a voltage of 0.1 volt or less between the positive electrode and the negative electrode when the switchable component is in the first switch position.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
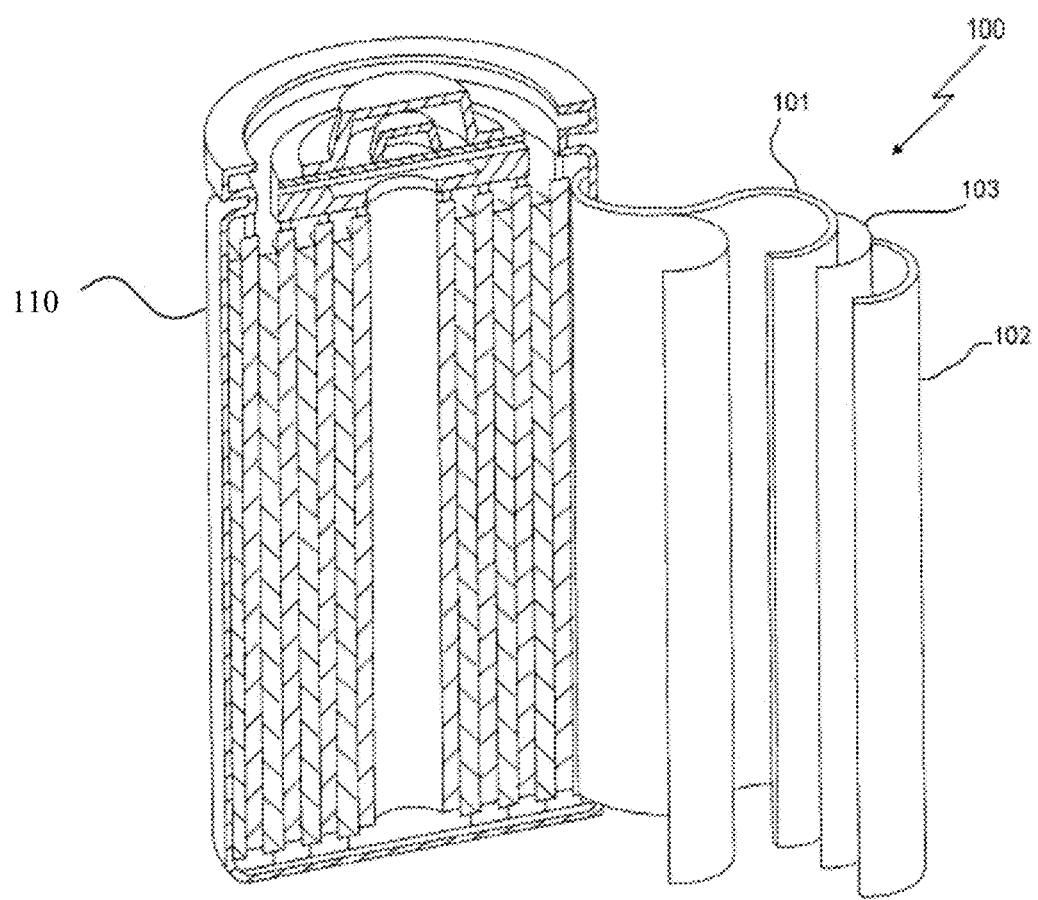
FIG. 1 is a schematic illustration of an embodiment of a lithium-ion cell.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Lithium-ion batteries are preferred for many small portable electronics applications because they provide high energy density, high specific energy, and high cycle life relative to alternative rechargeable battery technologies. However, commercially available lithium ion batteries are sensitive to over-discharge, and can exhibit undesirable performance loss and possibly an unsafe event if a battery, or a cell of a battery, is over-discharged. Accordingly, commercially available lithium ion batteries can employ sophisticated circuitry to avoid over-discharge. Further, long term storage or shipment of commercially available lithium ion batteries can be problematic.

While not wanting to be bound by theory, it is understood that the over-discharge susceptibility of current lithium-ion batteries arises from the combination of a graphite anode material and the copper current collector materials used. Copper is used because it is not susceptible to electrochemical alloying with lithium at the electrochemical potential of the graphite. However, copper can be oxidized if the anode is driven to a high potential, which can occur if a cell is over-discharged. Oxidized copper is understood to redeposit in a fibrous form, which can be life-limiting and potentially result an internal short circuit if the cell is subsequently recharged.

To avoid these and other safety issues, cells in currently available lithium-ion batteries are electronically monitored and their state of charge controlled, a task which may be performed using a battery management circuit ("BMC"). In addition to avoiding over-discharge of a lithium-ion cell to avoid degradation mechanisms such as copper dissolution, the battery management circuit can also provide over-charge protection. The cell monitoring and the state of charge control used in current lithium-ion batteries often exceeds that used in other rechargeable battery technologies, such as lead acid or nickel metal hydride batteries, where for many applications a battery management circuit may be omitted.

A strategy to provide a lithium-ion battery that can be discharged to 0 volts (V), or stored in a discharged state while avoiding at least the degradation of the copper current collector, or discharged below 0 V, i.e., discharged into reversal, is to avoid the use of a copper current collector and use a metal which is less susceptible to oxidation, such as titanium or stainless steel. However, titanium and stainless steel are less conductive than copper. For example, the conductivity of copper is over 20 times the conductivity of titanium. As a result, the rate capability of the cell using titanium or stainless steel instead of copper can be less than if copper were used. Accordingly, for some applications the rate capability provided by cells employing the titanium or stainless steel current collector is insufficient. Thus while use of a titanium or stainless steel current collector may provide improved over-discharge performance, the use of titanium or stainless steel may render the cell unsuitable for applications where high power capability is desirable.

For high power rechargeable battery applications, in particular where low-temperature performance and the ability to be recharged very rapidly is desirable, use of a technology which provides less energy density and/or less specific energy than a lithium-ion cell which employs a graphite or other low-potential anode material may be acceptable. For example, lead acid batteries are currently used for vehicle ignition and start-stop battery applications, e.g., "starting-lighting-ignition" (SLI) applications, despite the fact that they provide a fraction of the energy density and specific energy provided by lithium-ion batteries. However, if the duty cycle of a vehicle ignition or start-stop battery application is expanded and the battery is cycled over a greater state of charge range, the performance and life of lead acid batteries can be inadequate as the duty cycle of the application is extended beyond a classic starting-lighting-ignition (SLI) type duty cycle.

Thus, there remains a need for a battery technology that provides some of the desirable characteristics of lithium-ion batteries, such as high energy density and high specific energy, and characteristics currently provided by lead acid SLI batteries, such as high power, rapid recharge, and low-temperature performance. Furthermore, a technology that provides improved safety, including the ability to be safely operated near, at, or below 0 V, e.g., without external circuitry for over-discharge protection, would be highly desirable.

It has been surprisingly discovered that lithium-ion cells comprising a negative electrode comprising a metal oxide, e.g., a lithium metal oxide, having an electrochemical redox potential of 0.5 volt to 3 volts versus lithium, can be safely discharged to or below 0 V. It has been further surprisingly discovered that exemplary embodiment lithium-ion cells comprising a positive electrode comprising a lithium nickel oxide having a layered structure, and a negative electrode comprising a lithium metal oxide having an electrochemical redox potential of 0.5 volt to 3 volts versus lithium, can be safely discharged to or below 0 V. Furthermore, as is further disclosed below, the performance of such lithium-ion cells can be surprisingly improved by discharge to or below 0 V. Because the disclosed lithium-ion cells can be discharged to or below 0 V, numerous benefits are provided. For example, the disclosed lithium-ion cells may be stored and/or shipped in a discharged state to provide improved safety. Also, because storage at 0 V results in improved performance, a maintenance procedure that increases the life and/or extends usable energy range of a device including the disclosed lithium-ion battery system may provide improved product lifetime.

Capacity fade in lithium-ion cells is understood to occur due to "irreversible" loss of lithium. While not wanting to be bound by theory, it is understood that the incomplete relithiation (discharge) of lithium metal oxide cathode materials (e.g., materials of the formula $LiM^aO_2$ wherein $M^a$ is a metal and comprises Ni, Mn, Co, or a combination thereof; materials of the formula $LiM^b{_2}O_4$ wherein $M^b$ is a metal and comprises Mn, Ni, or a combination thereof; or materials of the formula $LiM^cPO_4$ wherein $M^c$ is a metal comprises Fe, Mn, Co, Ni, or a combination thereof; materials of the formula $Li_2M^dSiO_4$ wherein $M^d$ is a metal and comprises Fe, Mn, Co, or a combination thereof; following initial delithiation (charge) is not actually due to intrinsic irreversibility of the lithium metal oxide, but rather due to a precipitous decrease of lithium ion mobility in the lithium metal oxide as it approaches complete relithiation. Because the kinetics for reinsertion of the lithium ion into the $Li_{1-x}M^aO_2$, $Li_{1-x}M^b{_2}O_4$, $Li_{1-x}M^bPO_4$, or $Li_{2-x}M^dSiO_4$ structure become very slow, the electrochemical process can shift to a lower potential, below about 2 V vs. Li in the case of $LiM^aO_2$ materials, where it is possible to electrochemically introduce additional lithium into the structure resulting in recovery of the apparent "irreversible" loss of lithium. For example, in an embodiment in which the cathode material is a lithium nickel oxide having a layered structure, e.g., a lithium nickel oxide of the formula $LiM^aO_2$ wherein $M^a$ comprises Ni, it is understood that when the disclosed lithium ion cell is discharged to 0 V, Li ions associated with the "irreversible" capacity of the lithium nickel oxide diffuse from $Li_{1+x}MO_2$ type crystallographic sites to $Li_{1-x}MO_2$ type crystallographic sites, resulting in a restoration of the cell capacity. Specifically, extra Li can be reversibly inserted into lithium nickel oxide materials having a 2D α-NaFeO$_2$ layered structure by the electrochemical (e.g., redox) process of Equation 1.

$$LiM^aO_2 + xLi^+ + xe^- \leftrightarrow Li_{1+x}M^aO_2 \quad (1)$$

The redox process of Equation 1 is understood to take place at an electrochemical potential of nominally 2V vs. Li and is associated with a $M^{a2+/3+}$ redox transition, and occurs at a much lower potential than the nominally 4V vs. Li associated with a $M^{a3+/4+}$ redox transition, which is understood to be responsible for the cycling process shown in Equation 2.

$$LiM^aO_2 \leftrightarrow Li_{1-x}M^aO_2 + xLi^+ + xe^- \quad (2)$$

Figure 4:
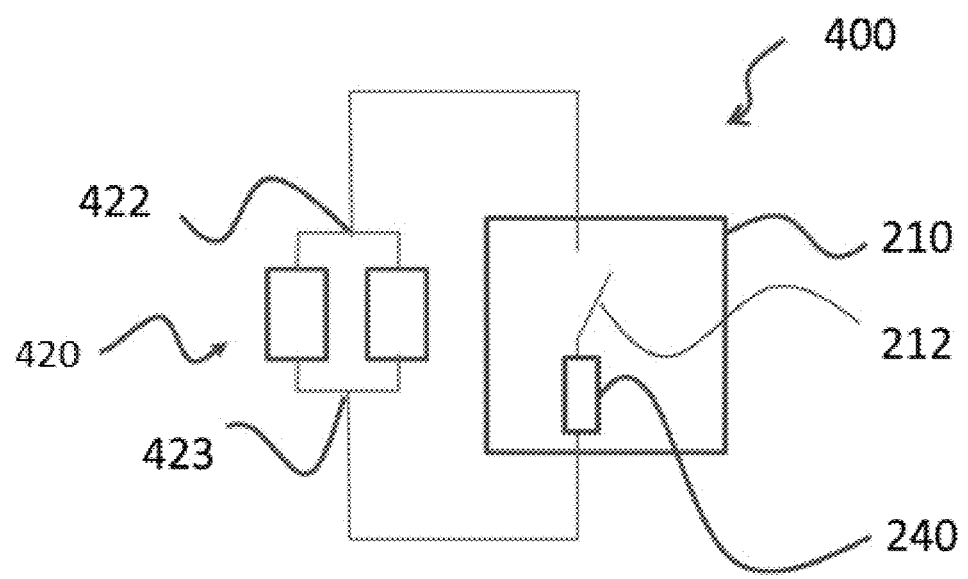
FIG. 4 is a schematic illustration of another embodiment of a battery system.

Thus the recovered "irreversible capacity" is understood to be initially associated with $Li_{1+x}M^aO_2$ type crystallographic sites, and the excess Li (e.g., $Li_x$ in $Li_{1+x}M^aO_2$) in these sites is understood to slowly diffuse into the $Li_{1-x}M^aO_2$ type crystallographic sites to reoccupy the remaining Li vacancies, resulting in slow recovery of the positive electrode potential to 3 V vs. Li, as shown in FIG. 4. Discharging a Li-ion cell comprising a lithium titanium oxide negative electrode material to 0 V therefore results in restoring the Li content of the lithium nickel oxide of positive electrode to its original (e.g., as-made) content.

While not wanting to be bound by theory, the mechanism for "irreversible" capacity loss and recovery in lithium metal oxides of the formula $LiM^b_2O_4$ is understood to be analogous to that disclosed for $LiM^aO_2$, and is not further elaborated upon herein for clarity.

Discharging a Li-ion cell comprising a metal oxide negative electrode material (e.g., a lithium metal oxide negative electrode material having an electrochemical redox potential of 0.5 volt to 3 volts versus lithium) to 0 V can have unexpected benefits. Like all rechargeable batteries, the performance of a lithium-ion battery fades as it is repeatedly cycled. However, performance loss by the disclosed Li-ion cells can be at least partially restored by discharging them to 0 V. This is demonstrated by the examples below, which show restoration of the performance of cells having a positive electrode comprising a lithium nickel oxide and a negative electrode comprising lithium titanium oxide.

While not wanting to be bound by theory, it is understood that a current collector comprising a metal which is electrochemically reactive with lithium at a potential of less than 0.5 volt versus Li/Li$^+$, e.g., −0.5 volt to less than 0.5 volt versus Li/Li$^+$, 0 volts to less than 0.4 volt versus Li/Li$^+$, or 0.1 volt to less than 0.3 volt versus Li/Li$^+$, such as aluminum, can be used in conjunction with a negative electrode comprising the metal oxide and/or the lithium metal oxide having an electrochemical redox potential of 0.5 volt to 3 volts versus lithium because the electrochemical potential of the metal oxide and/or the lithium metal oxide is greater than the potential at which aluminum alloys with lithium. For example, lithium titanium oxide has an electrochemical redox potential of 1.55 volts versus Li/Li$^+$, and this redox potential is greater than the potential at which aluminum alloys with lithium (0.4 V versus Li/Li$^+$). Thus if the lithium metal oxide having an electrochemical redox potential of 0.5 volt to 3 volts versus lithium is used, the challenges associated with copper, such as copper dissolution, can be avoided by using another metal such as aluminum for the current collector of the negative electrode. Further, and while not wanting to be bound by theory, it is understood that a solid electrolyte interphase (SEI), which is understood to comprise electrolyte reduction products, is believed to not form on lithium metal oxide because of its relatively high potential. These properties, in combination with the ability to be safely discharged to 0 V, results in a lithium-ion cell with unexpectedly improved safety and stability.

Furthermore, because a negative electrode comprising the metal oxide and/or the lithium metal oxide having an electrochemical redox potential of 0.5 volt to 3 volts versus lithium and a current collector comprising aluminum is relatively conductive, and because lithium intercalation of the metal oxide and/or the lithium metal oxide, e.g., lithium titanium oxide, is highly reversible, lithium-ion cells comprising such a negative electrode can provide high rate capability for both charge and discharge and excellent life.

Disclosed is a battery system comprising: a lithium-ion cell comprising a positive electrode comprising a first metal oxide, an electrolyte, and a negative electrode comprising a second metal oxide having an electrochemical redox potential of 0.5 volt to 3 volts versus lithium; and an electrical circuit comprising a switchable component connecting the positive electrode and the negative electrode, wherein the switchable component provides a shunt between the positive electrode and the negative electrode in a first switch position, and wherein the electrical circuit is configured to provide (e.g., achieve or reach) a voltage of 0.1 volt or less between the positive electrode and the negative electrode when the switchable component is in the first switch position.

In particular, mentioned is a battery system comprising: a lithium-ion cell comprising a positive electrode comprising a lithium nickel oxide having a layered structure, an electrolyte, and a negative electrode comprising a lithium metal oxide having an electrochemical redox potential of 0.5 volt to 3 volts versus lithium; and an electrical circuit comprising a switchable component connecting the positive electrode and the negative electrode, wherein the switchable component provides a shunt between the positive electrode and the negative electrode in a first switch position.

The first metal oxide of the positive electrode may comprise a material having a layered structure, e.g., a material of the formula $LiM^aO_2$ wherein $M^a$ is a metal and comprises Ni, Co, Mn, Fe, or a combination thereof. In an embodiment, $M^a$ is a transition metal, Al, or a combination thereof and comprises nickel. In another embodiment, $M^a$ is a transition metal, Al, or a combination thereof and comprises cobalt. Also mentioned are compounds of the formula $Li_xNi_{1-y}Fe_yO_2$.

The first metal oxide of the positive electrode may comprise a material having a spinel structure, e.g., a material of the formula $LiM^b_2O_4$ wherein $M^b$ is a metal and comprises Mn. In an embodiment, $M^b$ is a transition metal, Al, or combination thereof and comprises Mn. In another embodiment, $M^a$ is a transition metal, Al, or combination thereof and comprises Mn and Ni, e.g., $LiNi_{0.5}Mn_{1.5}O_4$. $LiMn_2O_4$ is mentioned.

The first metal oxide of the positive electrode may comprise a material having an olivine structure, e.g., a material of the formula $LiM^cPO_4$ wherein $M^c$ is a metal and comprises Fe, Mn, Co, Ni, or a combination thereof. In an embodiment, $M^c$ is a transition metal and comprises Fe. $LiFePO_4$ is mentioned.

The first metal oxide of the positive electrode may comprise a silicate, e.g., a material of the formula $Li_2M^d$ $SiO_4$ wherein $M^d$ is a metal and comprises Fe, Mn, Co, or a combination thereof. In an embodiment, $M^d$ is a transition metal, Al, or a combination thereof and comprises Fe, Mn, Co, or a combination thereof. $Li_2MnSiO_4$ is mentioned.

The first metal oxide of the positive electrode may comprise a material of the formula $Li_{2-x}M^eO_3$ wherein $M^e$ is a metal and comprises Mn. In an embodiment, $M^e$ is a transition metal, Al, or a combination thereof and comprises Mn. In another embodiment, $M^e$ is a transition metal, Al, or a combination thereof and comprises Mn and Ni, e.g., $Li_{2-x}MnO_3$.

In an embodiment, the first metal oxide is a lithium nickel oxide having a layered structure. The lithium nickel oxide may comprise a compound of Formula 1.

$$Li_xM^aO_2 \qquad (1)$$

In Formula 1, $M^a$ comprises Ni and $0<x<1.2$. In an embodiment, $M^a$ may comprise Ni, Al, a transition metal other than Ni, and may comprise Mn, Fe, Co, Ti, Cu, or a combination thereof. An embodiment in which $M^a$ comprises Ni, Mn, and Co is mentioned. In an embodiment, $M^a$ may comprise Ni, a transition metal other than Ni, and Al, Mg, B, Ga, Si, or a combination thereof. In an embodiment, $M^a$ comprises Ni, Al, and Mn, Fe, Co, Ti, Cu, or a combination thereof. Also, $0<x<1.15$, $0<x<1.1$, or $0<x<1.05$, for example $0.1<x<1.2$, $0.2<x<1.15$, or $0.3<x<1.1$.

For example, the lithium nickel oxide may comprise a compound of the formula $LiNiO_2$, $LiNi_{1-x}Co_yM1_zO_2$, $Li_{1+x'}Ni_\alpha Mn_\beta Co_\gamma M1_\delta O_{2-z'}f_{z'}$, or a combination thereof, wherein M1 is Al, Mg, Ti, B, Ga, Si, Mn, or Co; $0\le x\le 1$, $0\le y\le 1$, $0\le z\le 1$; $0\le x'\le 0.4$, $0\le \alpha\le 1$, $0\le \beta\le 1$, $0\le \gamma\le 1$, $0\le \delta\le 0.4$, and $0\le z'\le 0.4$; and $0\le n\le 3$. Compounds of the formula $LiNi_{0.8}Co_{0.15}Al_{0.05}O_2$, $LiMn_{0.5}Ni_{0.5}O_2$, $LiNi_{0.5}Co_{0.2}Mn_{0.3}O_2$, $LiNi_{0.8}Co_{0.1}Mn_{0.1}O_2$, $LiNi_{0.4}Co_{0.2}Mn_{0.4}O_2$ and $LiMn_{1/3}Co_{1/3}Ni_{1/3}O_2$ are mentioned.

In an exemplary embodiment, the first metal oxide is a lithium nickel oxide having the layered α-NaFeO$_2$-type structure and having cobalt enriched grain boundaries, an example of which is CAM-7, which is commercially available from CAMX Power LLC, Lexington, Mass., USA. Such materials are disclosed in U.S. Pat. No. 9,391,317, the content of which is incorporated herein by reference in its entirety. For example, the first metal oxide may comprise a particle comprising a plurality of crystallites comprising a first composition having a layered α-NaFeO$_2$-type structure and comprising lithium, nickel, cobalt, and oxygen; and a grain boundary between adjacent crystallites of the plurality of crystallites, and comprising a second composition having the layered α-NaFeO$_2$-type structure, a cubic structure, or a combination thereof, wherein a concentration of cobalt in the grain boundary is greater than a concentration of cobalt in the plurality of crystallites. In an embodiment, in the first composition of the lithium nickel oxide particle, the lithium may be present in an amount of 0.1 to 1.3 moles, per mole of the first composition, the nickel may be present in an amount of 0.1 to 0.99 mole, per mole of the first composition, the cobalt may be present in an amount of 0 to 0.5 mole, per mole of the first composition, and the oxygen may be present in an amount of 1.7 to 2.3 moles, per mole of the first composition. In another embodiment, in the first composition of the lithium nickel oxide particle, the lithium may be present in an amount of 0.1 to 1.3 moles, per mole of the first composition, the nickel may be present in an amount of 0.5 to 0.96 mole, per mole of the first composition, the cobalt may be present in an amount of 0 to 0.5 mole, per mole of the first composition, and the oxygen may be present in an amount of 1.7 to 2.3 moles, per mole of the first composition. In another embodiment, in the first composition of the lithium nickel oxide particle, the lithium may be present in an amount of 0.1 to 1.3 moles, per mole of the first composition, the nickel may be present in an amount of 0.6 to 0.92 mole, per mole of the first composition, the cobalt may be present in an amount of 0 to 0.4 mole, per mole of the first composition, and the oxygen may be present in an amount of 1.7 to 2.3 moles, per mole of the first composition.

In an embodiment, the first and second compositions of the first metal oxide may each independently comprise a composition of Formula 1:

$$Li_aQ^1_yQ^2_zM^1O_2 \qquad (1)$$

wherein $Q^1$ is Mg, Sr, Ca, Cu, Zn, or a combination thereof, $Q^2$ is Mn, Al, Mg, Ca, Sr, Ba, Zn, Ti, Zr, Cr, Mo, Fe, V, Si, Ga, B, or a combination thereof, $M^1$ is Ni and Co, $0.1\le a\le 1.2$, $0<y\le 0.2$, and $0\le z\le 0.6$. In an exemplary embodiment, a concentration of cobalt in the second composition is greater that the concentration of cobalt in the first composition. An embodiment in which $Q^1$ consists of Mg, Sr, Ca, Cu, or Zn, and an embodiment wherein $Q^1$ is Mg, are each specifically mentioned. In Formula 1, a and y may be independently selected so long as Formula 1 is satisfied, and, may satisfy $0.2\le a\le 1.1$, specifically $0.3\le a\le 1$, and y of Formula 1 may satisfy $0.01<y\le 0.15$, specifically $0.05<y\le 0.1$.

In an embodiment, the first and second compositions may each independently comprise a composition of Formula 2.

$$Li_aNi_{(1-x-y)}Co_xM^2_yO_b \qquad (2)$$

In Formula 2, $M^2$ is Al, V, Ti, B, Zr, Mn, or a combination thereof, $0.1\le a\le 1.3$, $0.01\le x\le 0.5$, $0<y\le 0.2$, and $1.7\le b\le 2.3$, and in an exemplary embodiment x in the second composition is greater than x in the first composition. In an embodiment $M^2$ is Al, V, Ti, B, Zr, or Mn. An embodiment in which $M^2$ is Al or B is specifically mentioned. In Formula 2, a, x, and y may be independently selected so long as Formula 2 is satisfied, and a of Formula 2 may satisfy $0.2\le a\le 1.1$, specifically $0.3\le a\le 1$, x of Formula 2 may satisfy $0.02\le x\le 0.4$, specifically $0.04\le x\le 0.3$, and y of Formula 2 may satisfy $0.01<y\le 0.15$, specifically $0.05<y\le 0.1$.

In an embodiment, the first and second compositions may each independently comprise a composition of Formula 3.

$$Li_aNi_{(1-x-y-z)}Co_xM^3_yMn_zO_b \qquad (3)$$

In Formula 3, $M^3$ is Al, V, Ti, B, Zr, or a combination thereof, $0.1\le a\le 1.3$, $0.01\le x\le 0.5$, $0\le y\le 0.1$, $0.1\le z\le 0.6$, and $1.7\le b\le 2.3$. In an embodiment, $M^3$ is Al, V, Ti, B, or Zr. An embodiment in which $M^3$ is Al or B is specifically mentioned. In Formula 3, a, x, y, z, and b may be independently selected so long as Formula 3 is satisfied, and a of Formula 3 may satisfy $0.2\le a\le 1.1$, specifically $0.3\le a\le 1$, x of Formula 3 may satisfy $0.02\le x\le 0.4$, specifically $0.04\le x\le 0.3$, y of Formula 3 may satisfy $0.01<y\le 0.09$, specifically $0.05<y\le 0.08$, z of Formula 3 may satisfy $0.15\le z\le 0.5$, specifically $0.2\le z\le 0.4$, and b of Formula 3 may satisfy $1.8\le b\le 2.2$, specifically $1.9\le b\le 2.1$.

In an embodiment, the first and second compositions may each independently comprise a composition of Formula 4.

$$Li_aNi_{(1-x)}Co_xO_2 \qquad (4)$$

In Formula 4, $0.1\le a\le 1.3$ and $0<x<0.2$. In an embodiment, a of Formula 4 may satisfy $0.2\le a\le 1.1$, specifically $0.3\le a\le 1$, and x of Formula 4 may satisfy $0.02<x<0.18$, specifically $0.04<x<0.16$. In another embodiment, the first composition, the second composition, or a combination thereof, comprises a composition of Formula 4 wherein $0.1\le a\le 1.3$ and 0.2<x<0.5. In an embodiment, x of Formula 4 may satisfy 0.25<x<0.45, specifically 0.3<x<0.4.

In an embodiment, the first composition comprises a composition of Formula 4 wherein 0<x<0.2 and the second composition comprises a composition of Formula 4 wherein 0.2<x<0.5.

Representative lithium nickel oxides include $Li_{1.05}Mg_{0.025}Ni_{0.92}Co_{0.08}O_{2.05}$, $Li_{1.01}Mg_{0.024}Ni_{0.88}Co_{0.12}O_{2.03}$, $Li_{1.05}Mg_{0.025}Ni_{0.88}Co_{0.12}O_{2.05}$, $Li_{1.05}Mg_{0.025}NiO_{2.05}$, and $Li_{1.01}Mg_{0.023}Ni_{0.93}Co_{0.07}O_{2.03}$. A combination comprising at least one of the foregoing may be used.

The first metal oxide may have any suitable particle size, such as a particle size of 0.1 micrometer (μm) to 100 μm, or 1 μm to 10 μm. The particle size may be determined by light scattering.

The first metal oxide particle may be prepared by contacting a lithium compound, a cobalt compound, and a nickel compound to form a mixture; heat treating the mixture at 30 to 200° C. to form a dried mixture; heat treating the dried mixture at 200 to 500° C. for 0.1 to 5 hours; then heat treating at 600 to 800° C. for 0.1 to 5 hours to manufacture the particle. The lithium compound may comprise a lithium salt, such as lithium nitrate, lithium carbonate, lithium hydroxide, or a combination thereof. The cobalt compound may be a cobalt nitrate such as $Co(NO_3)_2 \cdot 6H_2O$, a cobalt chloride such as $CoCl_2 \cdot 6H_2O$, or cobalt isopropoxide, or a combination thereof. Also, the nickel compound may be a lithium nickel oxide.

The positive electrode preferably comprises a current collector. The current collector may comprise aluminum, such as an aluminum alloy. Use of an aluminum foil current collector for the positive electrode is mentioned.

The positive electrode may be provided by combining the first metal oxide, a conductive agent, and a binder, and providing a coating comprising the first metal oxide, the conductive agent, and the binder on the current collector. The conductive agent may comprise any conductive agent that provides suitable properties and may be amorphous, crystalline, or a combination thereof. The conductive agent may comprise a carbon black, such as acetylene black or lamp black, a mesocarbon, graphite, carbon fiber, carbon nanotubes such as single wall carbon nanotubes or multi-wall carbon nanotubes, or a combination thereof. The binder may comprise any binder that provides suitable properties and may comprise polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example. The positive electrode may be manufactured by combining the first metal oxide, the conductive agent, and the binder in a suitable ratio, e.g., 80 to 98 weight percent of the first metal oxide, 2 to 20 weight percent of the conductive agent, and 2 to 10 weight percent of the binder, based on a total weight of the first metal oxide, the conductive agent, and the binder. The first metal oxide, the conductive agent, and the binder may be suspended in a suitable solvent, such as N-methylpyrrolidinone, and disposed on a suitable substrate, such as aluminum foil, and dried in air to provide the positive electrode.

The negative electrode may comprise a second metal oxide having an electrochemical redox potential of 0.5 volt (V), 0.6 V, 0.7 V, 0.8 V, 0.9 V, or 1 V to 3 V, 2.8 V, 2.6 V, 2.4 V, 2.2 V, or 2 V versus lithium. An embodiment in which the second metal oxide has an electrochemical redox potential of 0.8 V to 2.4 V, e.g., 1 V to 2 V, such as 1.55 V, is mentioned.

Having an electrochemical redox potential of 0.5 V to 3 V versus lithium means that the second metal oxide can be oxidized and reduced at a potential which is equal to or greater than 0.5 V and equal to or less than 3 V versus $Li/Li^+$. The redox potential may be determined by electrochemically oxidizing and reducing the second metal oxide with a potentiostat/galvanostat, using a non-aqueous electrolyte, e.g., 1 molar (M) $LiPF_6$ in propylene carbonate, a lithium negative electrode, and a lithium reference electrode at room temperature, e.g., 20° C. Additional details of measuring redox potential can be determined by one of skill in the art without undue experimentation, and thus are not further elaborated upon herein.

The second metal oxide may comprise a metal oxide, a lithium metal oxide, or a combination thereof, wherein the metal of the second metal oxide comprises Ti, Nb, Zr, Hf, W, or a combination thereof. An embodiment in which the second metal oxide comprises titanium oxide, niobium oxide, a lithium titanium oxide, a lithium niobium oxide, or a combination thereof is mentioned. A weight ratio of the lithium titanium oxide and the lithium niobium oxide may be 0.1:1 to 10:1, e.g. 0.5:1 to 2:1. Use of a negative electrode wherein the second metal oxide consists of lithium titanium oxide is specifically mentioned.

The second metal oxide may have a spinel structure. In an embodiment the second metal oxide is a lithium titanium oxide, and the lithium titanium oxide may have a spinel type structure. The lithium titanium oxide may be of Formula 5.

$$Li_{4+y}Ti_5O_{12}, \qquad (5)$$

In Formula 5, 0≤y≤3, 0≤y≤3, 0.1≤y≤2.8, or 0≤y≤2.6.

Alternatively, the lithium titanium oxide may be of Formula 6.

$$Li_{3+z}Ti_{6-2}O_{12}, \qquad (6)$$

In Formula 6, 0≤z≤1. In an embodiment 0≤z≤1, 0.1≤z≤0.8, or 0≤z≤0.5.

A combination comprising at least one of the foregoing lithium titanium oxides may be used. Use of $Li_4Ti_5O_{12}$ is mentioned.

The second metal oxide may comprise a niobium oxide, a lithium niobium oxide, or a combination thereof. The second metal oxide may be a niobium oxide of Formula 7.

$$Li_qM^4_{1-r}Nb_{2+r}O_7 \qquad (7)$$

In Formula 7, $M^4$ is Ti, Zr, Hf, W, or a combination thereof, 0≤q≤3, and 0≤r≤1. In an embodiment, $M^4$ is Ti or Zr. Also, q and r may be according to 0<q<3, and 0<r≤1, or 0<q<3, and 0<r<1. Use of $LiNb_2O_7$ is specifically mentioned.

The second metal oxide may comprise a titanium niobium oxide which is a reaction product of titanium oxide and niobioum oxide, such as titanium niobium oxides having a molar ratio of Ti:Nb of 1:2, such as an oxide according to Formula 8.

$$TiNb_sO_{(2+2.5s)} \qquad (8)$$

In Formula 8, In Formula 8, 0<s≤20, 0.5≤s≤15, or 0.75≤s≤10. $TiNb_2O_7$ (s=2), $TiNb_6O_{19}$ (s=3), and $Ti_2Nb_{10}O_{29}$ (s=5) are representative. Also disclosed are $TiNb_6O_{17}$ and $Ti_2Nb_2O_9$, as disclosed in C. Lin et al., "TiNb$_6$O$_{17}$: a new electrode material for lithium-ion batteries," *Chem. Commun.*, 2015, 51, 8970-8973, the content of which is, in its entirety, incorporated herein by reference in its entirety. The titanium niobium oxide may comprise a compound wherein Nb is substituted for Ti to provide a compound of Formula 9.

$$Ti_{1-r}Nb_rNb_sO_{(2+2.5s)} \quad (9)$$

In Formula 9, 0<s≤20, 0.5≤s≤15, or 0.75≤s≤10 and 0≤t<1, 0<t<0.9, or 0<t<0.8. For example, Ti$_{0.9}$Nb$_{0.1}$Nb$_2$O$_7$ is mentioned, as disclosed in J. Han et al., "New Anode Framework for Rechargeable Lithium Batteries," Chem. Mater., 2011, 23 (8), pp 2027-2029, the content of which is, in its entirety, incorporated herein by reference in its entirety.

The second metal oxide may comprise a tungsten vanadium oxide, and lithium insertion compounds thereof. Examples include a material of the formula W$_x$V$_{3-x}$O$_{7.5}$ wherein 0.8≤x≤1.2, or W$_x$V$_{3-x}$O$_7$ wherein 0.2≤x≤0.5. WV$_2$O$_{7.5}$ and W$_{0.2}$V$_{2.8}$O$_7$ are mentioned. Also mentioned are H—Nb$_2$O$_5$, N—Nb$_2$O$_5$, LiNb$_{13}$O$_{33}$, Nb$_3$O$_7$F, VNb$_9$O$_{25}$, GeNb$_{18}$O$_{47}$, TiNb$_2$O$_7$, Ti$_2$Nb$_{10}$O$_{29}$, TiNb$_{24}$O$_{62}$, WNb$_{12}$O$_{33}$, W$_3$Nb$_{14}$O$_{44}$, W$_8$Nb$_{18}$O$_{69}$, WV$_2$O$_{7.5}$, and W$_{0.2}$V$_{2.8}$O$_7$, and their lithium insertion compounds, such as Li$_{1.9}$Nb$_2$O$_5$, Li$_{1.7}$Nb$_2$O$_5$, Li$_{12}$Nb$_{13}$O$_{33}$, LiNb$_3$O$_7$F, Li$_{11.4}$VNb$_9$O$_{25}$, Li$_{17}$GeNb$_{18}$O$_{47}$, Li$_{1.2}$TiNb$_2$O$_7$, Li$_{6.4}$Ti$_2$Nb$_{10}$O$_{29}$, Li$_{15.7}$TiNb$_{24}$O$_{62}$, Li$_{10.7}$WNb$_{12}$O$_{33}$, Li$_{16.8}$W$_3$Nb$_{14}$O$_{44}$, Li$_{22}$W$_8$Nb$_{18}$O$_{69}$, Li$_{4.3}$WV$_2$O$_{7.5}$, and Li$_{3.6}$W$_{0.2}$V$_{2.8}$O$_7$.

The second metal oxide may have any suitable particle size, such as a particle size of 0.1 μm to 100 μm, or 1 μm to 10 μm.

The negative electrode comprises a current collector. As is further discussed above, and while not wanting to be bound by theory, it is understood that because the electrochemical potential of the second metal oxide is at least 0.5 V versus Li/Li$^+$, e.g., above 1 V versus Li/Li$^+$, when the second metal oxide is lithium titanium oxide, the negative electrode may comprise a current collector comprising a metal other than copper because other metals, such as aluminum and titanium, provide suitable stability at the potentials present when a second metal oxide having an electrochemical redox potential of 0.5 volt to 3 volts versus lithium is used. While not wanting to be bound by theory, it is understood that metals such as aluminum are electrochemically reactive with lithium at a potential of 0.1 volt to 0.5 volt versus lithium, whereas copper is not, which is why copper is used as a current collector material when graphite is used as an anode material. Thus a current collector comprising a metal which is electrochemically reactive with lithium at a potential of 0.1 V to 0.5 V, 0.15 V to 0.45 V, or 0.2 V to 0.4 V versus lithium may be used.

The current collector may comprise aluminum, titanium, steel, or a combination thereof. Use of an aluminum, an aluminum alloy, or a stainless steel is mentioned. Representative aluminum alloys include aluminum alloys such as 1050, 1100, 1145, 1235, 1350, 3003, 3105, 5052, and 6061. Representative steels include 201, 202, 303, 304, 316, 410, 420, and 430 stainless steel.

The negative electrode may be provided by combining the second metal oxide, a conductive agent, and a binder, and providing a coating comprising the second metal oxide, the conductive agent, and the binder on the current collector selected for the negative electrode. The conductive agent may comprise any conductive agent that provides suitable properties and may be amorphous, crystalline, or a combination thereof. The conductive agent may comprise a carbon black, such as acetylene black or lamp black, a mesocarbon, graphite, carbon fiber, carbon nanotubes such as single wall carbon nanotubes or multi-wall carbon nanotubes, or a combination thereof. The binder may comprise any binder that provides suitable properties and may comprise polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(l-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The negative electrode may be manufactured by combining the second metal oxide, the conductive agent, and the binder in a suitable ratio, e.g., 80 to 98 weight percent of the lithium metal oxide, 2 to 20 weight percent of the conductive agent, and 2 to 10 weight percent of the binder, based on a total weight of the second metal oxide, the conductive agent, and the binder. The second metal oxide, the conductive agent, and the binder may be suspended in a suitable solvent, such as N-methylpyrrolidinone, and disposed on a suitable current collector, such as aluminum, titanium, or stainless steel, and dried in air to provide the negative electrode.

The positive, the negative electrode, and a separator may be combined to provide a lithium-ion cell, an embodiment of which is shown in FIG. 1. The lithium-ion cell 100 comprises a positive electrode 101, a negative electrode 102, and a separator 103 interposed between the positive electrode 101 and the negative electrode 102. The separator may comprise a microporous membrane, and may comprise a porous film comprising polypropylene, polyethylene, or a combination thereof, or may be a woven or non-woven material such a glass-fiber mat. The cell case 110 may be a metal can, or can be a laminate film, such as a heat-sealable aluminum foil, such as an aluminum coated polypropylene film.

The lithium-ion cell also comprises an electrolyte which contacts the positive electrode 101, the negative electrode 102, and the separator 103. The electrolyte may comprise an organic solvent and a lithium salt. The organic solvent may comprise a linear carbonate, a cyclic carbonate, or a combination thereof. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, or a combination thereof.

Representative lithium salts include LiPF$_6$, LiBF$_4$, LiAsF$_6$, LiClO$_4$, LiCF$_3$SO$_3$, Li(CF$_3$SO$_2$)$_2$N, LiN(SO$_2$C$_2$F$_5$)$_2$, LiSbF$_6$, LiC(CF$_3$SO$_2$)$_3$, LiC$_4$F$_9$SO$_3$, and LiAlCl$_4$. The lithium salt may be dissolved in the organic solvent. A combination comprising at least one of the foregoing can be used. The concentration of the lithium salt can be 0.1 to 2 molar (M) in the electrolyte.

The lithium-ion cell may have any suitable configuration or shape, and may be cylindrical or prismatic.

The battery system may comprise any suitable number of cells, e.g., 1 to 50,000 cells, 2 to 25,000 cells, 4 to 15,000 cells, 8 to 5,000 cells, 16 to 2,000 cells, or 32 to 1,000 cells. The cells may be connected in any suitable configuration, including a serial connection, a parallel connection, or a combination thereof.

Figure 2:
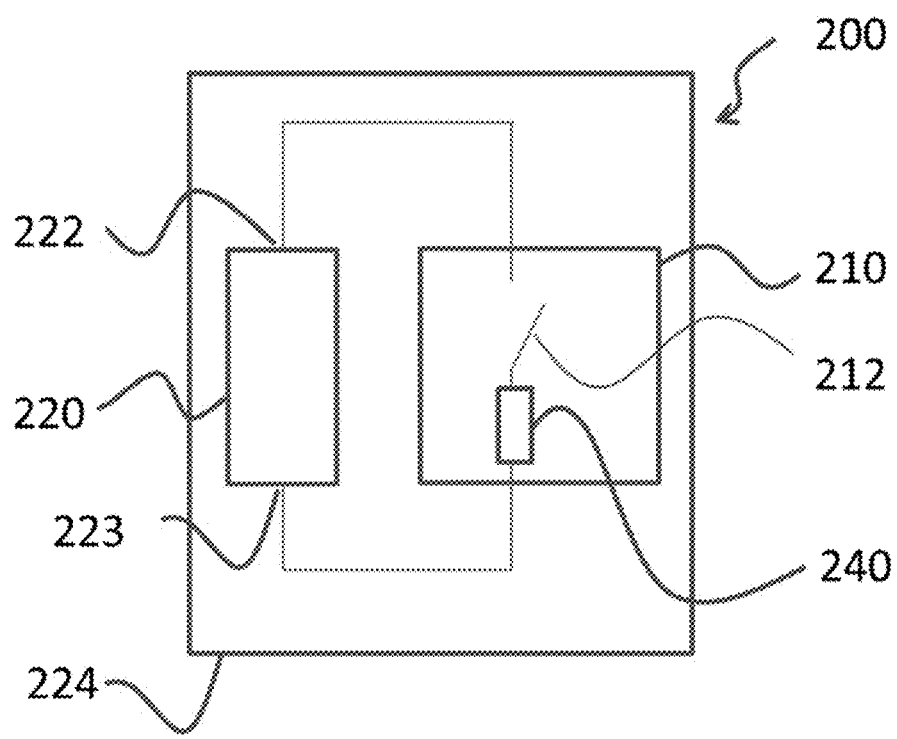
FIG. 2 is a schematic illustration of an embodiment of a battery system.

The battery system 200, an embodiment of which is shown in FIG. 2, comprises an electrical circuit 210 comprising a switchable component 212 connecting the positive electrode 222 and the negative electrode 223 of the cell 220, wherein the switchable component 210 provides a shunt 240 between the positive electrode 222 and the negative electrode 223 in a first switch position. The foregoing components may be provided within an enclosure 224.

Figure 3:
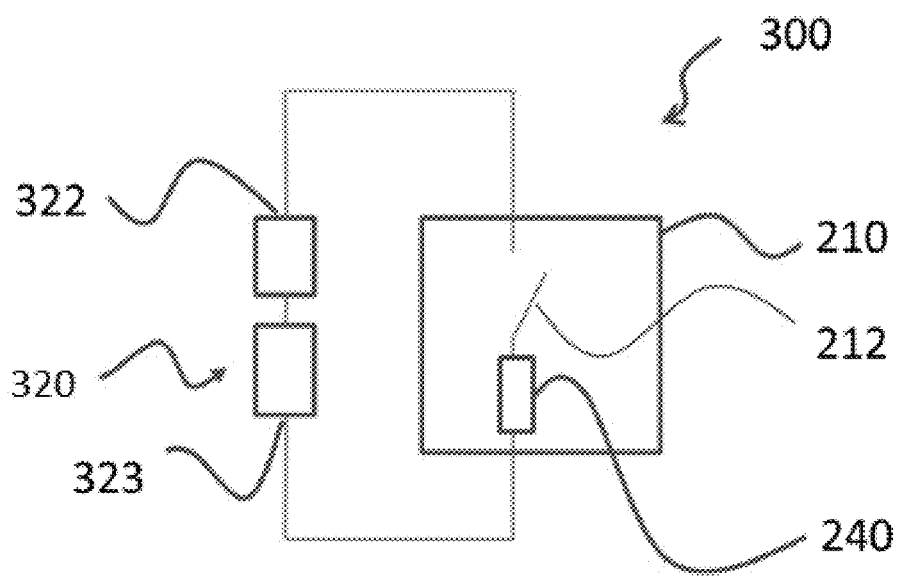
FIG. 3 is a schematic illustration of another embodiment of a battery system.

In another embodiment, a battery system 300, an embodiment of which is shown in FIG. 3, comprises electrical circuit 210 comprising a switchable component 212 connecting a positive pole 322 and the negative pole 323 of series-connected cells 320, wherein the switchable component 210 provides a shunt 240 between the positive pole 322 and the negative pole 323 in a first switch position.

In another embodiment, a battery system 400, an embodiment of which is shown in FIG. 4, comprises electrical circuit 210 comprising a switchable component 212 connecting a positive pole 422 and the negative pole 423 of parallel-connected cells 420, wherein the switchable component 212 provides a shunt 240 between the positive pole 422 and the negative pole 423 in a first switch position.

Figure 5:
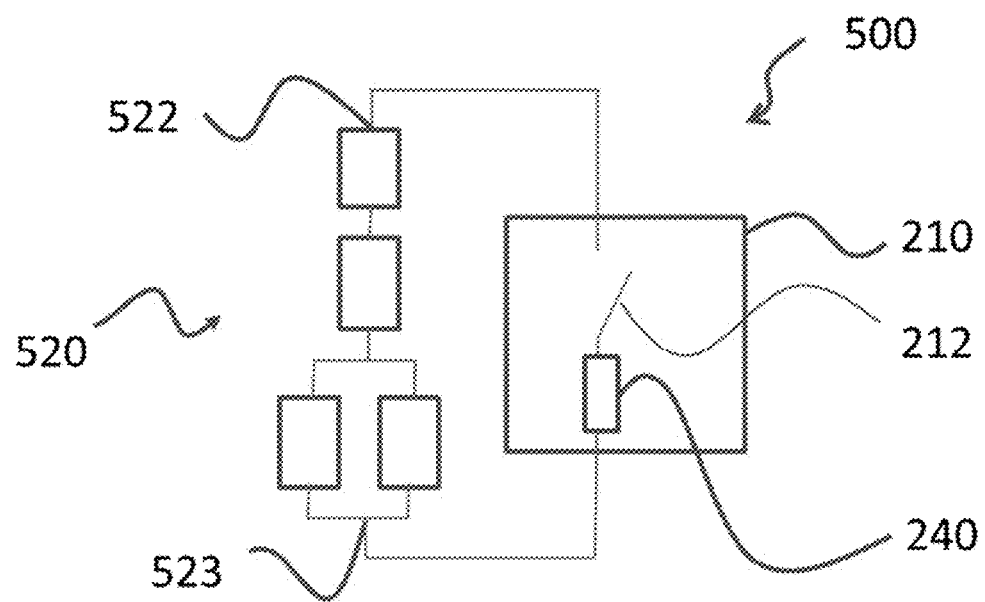
FIG. 5 is a schematic illustration of another embodiment of a battery system.

In another embodiment, a battery system 500, an embodiment of which is shown in FIG. 5, comprises electrical circuit 210 comprising a switchable component 212 connecting a positive pole 522 and the negative pole 523 of parallel and series-connected cells 520, wherein the switchable component 212 provides a shunt 240 between the positive pole 522 and the negative pole 523 in a first switch position.

The shunt is configured to discharge the battery at a suitable rate, e.g., configured to discharge the battery in 10 hours to 0.01 hour, 5 hours to 0.05 hour, 1 hours to 0.1 hour, or 0.5 hour to 0.2 hour. The shunt may be distinguished from a resistive load such as a heater in that the shunt is configured to discharge the battery to less than 0.1 V, e.g., 0 V, whereas a resistive load such as a heater is configured to increase the temperature of the battery while consuming an acceptable amount of energy. The electrical circuit may comprise any suitable components, and may be a battery management circuit, for example. Integrated circuits for battery management providing functions such as state of charge, power management, voltage conditioning, and charge control are commercially available from Texas Instruments (Dallas, Tex.), for example. In an embodiment, the electrical circuit further comprises a heater, such as a resistive load configured for heating, e.g., to heat the battery.

A "shunt," as used herein, refers to a conductive connection between the positive electrode and the negative electrode. The shunt may have a resistance R of 0.001 R to 10 R, e.g., 0.005 R, 0.01 R, 0.05 R, 0.1 R, or 0.2 R to 5 R, 1 R, 0.5 R, 0.1 R, to 0.3 R, wherein the resistance R is determined according to Equation 3

$$R = V/C \qquad (3)$$

wherein V is the voltage of the battery and C is the current to discharge the battery in one hour. For example, a 40 ampere-hour (Ah), 12 volt (V) battery may be provided with a shunt having a resistance of 0.3 ohms, e.g., 0.0003 ohms to 3 ohms to shunt the battery. The shunt may have a resistance of at least 0.0003 ohm ($\Omega$), 0.001 ohm ($\Omega$) to 1 $\Omega$, 0.005$\Omega$ to 0.5$\Omega$, or 0.01$\Omega$ to 0.1$\Omega$. The shunt may be provided by a resistor, which, when engaged, electrically connects the positive electrode and the negative electrode.

The switchable component which provides the shunt may comprise any suitable switch. The switch may comprise a toggle switch, a pushbutton switch, or a lever actuated switch, or a switch of an integrated circuit, such an analog switch, wherein the switching element is provided by a transistor, such as a metal-oxide-semiconductor field-effect transistor (MOSFET) transistor. The switch may be configured as a single-pole/single throw switch, a normally open switch, or a normally closed switch.

The switch may have any desired number of positions, so long as the switch positions comprise a position, e.g., a first switch position, which provides the shunt between the positive electrode and the negative electrode. When the shunt is engaged, a voltage between the positive electrode and the negative electrode of the lithium-ion cell may be 0.1 volt or less, e.g., −0.1 V to 0.1 V, 0 V to 0.1 V, 0.01 millivolt (mV) to 0.1 V, or 0.05 mV to 0.01 V. In an embodiment, when the battery system comprises a plurality of lithium-ion cells, a voltage between the positive electrode and the negative electrode of each lithium-ion cell may independently be 0.1 volt or less, e.g., −0.1 V to 0.1 V, 0 V to 0.1 V, 0.01 mV to 0.1 V, or 0.05 mV to 0.01 V. In an embodiment in which the battery system comprises cells connected in series, parallel, or a parallel and series, a voltage between a positive pole and a negative pole of the connected lithium-ion cells, or any subset of the connected cells, may be 0.1 volt or less, e.g., −0.1 V to 0.1 V, 0 V to 0.1 V, 0.01 mV to 0.1 V, or 0.05 mV to 0.01 V.

Also disclosed is a method of restoring a battery. As is further discussed above, it has been surprisingly discovered that the capacity of the disclosed battery can be improved by discharging the battery and providing a shunt between the positive electrode and the negative electrode of the cell to restore the battery. While not wanting to be bound by theory, it is understood that when the aged battery is discharged to 0 Volts, its performance can be restored by restoring the Li content of its electrodes to their original as-made level. While not wanting to be bound by theory, it is understood that upon discharged to 0 V, the electrochemical kinetic properties of aged cells are restored by restoring the positive electrode materials to their as-made lithium content.

The discharging of the battery may comprise any suitable method of discharge, and may comprise discharge at any suitable rate, such as discharge at a rate of 100 C or less, e.g., discharge at 100 C, 10 C, 1 C, 0.1 C, or 0.02 C to 0.0001 C, 0.0005 C, 0.001 C, 0.005 C, or 0.01 C. A C rate is a current which will discharge a fully charged cell in one hour, e.g., for a battery having a discharge capacity of 1.6 ampere-hours, C would be 1.6 amperes. The discharging may comprise discharging the battery to 0.1 volt or less, e.g., −0.1 V to 0.1 V, −0.05 V to 0.05 V, or 0 V to 0.01 V for a period of 0.001 hour (h) or longer, e.g., 0.001 h to 1000 h, 0.01 h to 500 h, or 0.1 h to 50 h.

The shunt may be provided for any suitable time, and the shunting of the battery may be provided for at least 0.001 hours (h), e.g., 0.001 h to 1000 h, 0.01 h to 500 h, or 0.1 h to 50 h. Also, the shunting may comprise shunting at any suitable temperature, and may comprise shunting the battery at a battery temperature of −40° C. to 50° C., −20° C. to 40° C., or −10° C. to 30° C. In an embodiment, the battery is stored in a discharged state, e.g., at 0 V, for 0.05 h to 1000 h, 0.1 h to 500 h, or 1 h to 250 h. The storage may be at −40° C. to 50° C., −20° C. to 40° C., or −10° C. to 30° C.

In an embodiment, the shunt provides a voltage 0.1 volt or less, e.g., −0.1 V to 0.1 V, −0.05 V to 0.05 V, or 0 V to 0.01 V for at least 0.001 hours (h), e.g., 0.001 h to 1000 h, 0.01 h to 500 h, or 0.1 h to 50 h, wherein the voltage may be a cell voltage, or a voltage of a group of cells, such as a group of series-connected cells, a group of parallel-connected cells, or across a group of cells comprising series and parallel connections. In an embodiment, the shunt provides a battery voltage 0.1 volt or less, e.g., −0.1 V to 0.1 V, −0.05 V to 0.05 V, or 0 V to 0.01 V for at least 0.001 hour (h), e.g., 0.001 h to 1000 h, 0.01 h to 500 h, or 0.1 h to 50 h.

The shunting of the battery, e.g., providing a shunt between the positive electrode and the negative electrode of the cell, e.g., providing a shunt between a positive pole and a negative pole of a plurality of connected cells, may comprise any suitable method of shunting. For example, the method of shunting may comprise connecting the positive electrode and the negative electrode with a conductor, such as a wire (e.g., a copper wire), or a method which comprises connecting, e.g., electrically connecting, the positive electrode and the negative electrode with a switchable component which provides a shunt between the positive electrode and the negative electrode in a first switch position, and placing the switchable component in the first switch position to provide the shunt between the positive electrode and the negative electrode. As is further discussed above, the shunt may have a resistance of 0.001 R to 10 R, wherein R is determined according to Equation 3.

Also disclosed is a method of manufacturing a battery system, the method comprising: connecting a lithium-ion cell to an electrical circuit to manufacture the battery, wherein the lithium-ion cell comprises a positive electrode comprising a first metal oxide, an electrolyte, and a negative electrode comprising a second metal oxide having an electrochemical redox potential of 0.5 volt to 3 volts versus lithium, wherein the electrical circuit comprises a switchable component connecting the positive electrode and the negative electrode, wherein the switchable component provides a shunt between the positive electrode and the negative electrode in a first switch position, and wherein the electrical circuit is configured to provide a voltage of 0.1 volt or less between the positive electrode and the negative electrode for at least 0.001 hour when the switchable component is in the first switch position.

In an exemplary embodiment, the method of manufacturing the battery system comprises connecting a lithium-ion cell to an electrical circuit to manufacture the battery, wherein the lithium-ion cell comprises a positive electrode comprising a lithium metal oxide (e.g., a lithium nickel oxide having a layered structure), an electrolyte, and a negative electrode comprising metal oxide, a lithium metal oxide, or a combination thereof having an electrochemical redox potential of 0.5 volt to 3 volts versus lithium, and wherein the electrical circuit comprises a switchable component connecting the positive electrode and the negative electrode, wherein the switchable component provides a shunt between the positive electrode and the negative electrode in a first switch position.

The connection may be provided by any suitable method, such as by soldering or providing a crimp connection, for example. The lithium-ion cell and the electrical circuit may be as disclosed above.

The battery system may be integrated into any suitable application, and may be used to provide a starting-lighting-ignition type duty cycle, for example. In an embodiment, the battery system is used in a start-stop, or micro-hybrid duty cycle in which the battery powers the vehicle's auxiliary loads when the vehicle is stopped and its internal combustion engine automatically turns off, and the battery then automatically starts the engine when the accelerator is depressed. In an embodiment, the battery system is included in a vehicle, and may be used to power an electric motor, such as a starting motor or traction motor, for example. In an embodiment, the vehicle comprises an electric motor; and the battery system connected to the electric motor.

In an aspect, disclosed is a battery system comprising: a lithium-ion cell comprising a positive electrode comprising a lithium nickel oxide having a layered structure, an electrolyte, and a negative electrode comprising a lithium metal oxide having an electrochemical redox potential of 0.5 volt to 3 volts versus lithium; and an electrical circuit comprising a switchable component connecting the positive electrode and the negative electrode, wherein the switchable component provides a shunt between the positive electrode and the negative electrode in a first switch position.

Also disclosed is a method of restoring a battery, the method comprising: providing a battery comprising a lithium-ion cell comprising a positive electrode comprising a lithium nickel oxide having a layered structure, an electrolyte, and a negative electrode comprising a lithium metal oxide having an electrochemical redox potential of 0.5 volt to 3 volts versus lithium; and providing a shunt between the positive electrode and the negative electrode of the cell to restore the battery by discharging the battery to 0.1 volt or less for at least 0.001 hour.

Also disclosed is a method of manufacturing a battery system, the method comprising: connecting a lithium-ion cell to an electrical circuit to manufacture the battery, wherein the lithium-ion cell comprises a positive electrode comprising a lithium nickel oxide having a layered structure, an electrolyte, and a negative electrode comprising a lithium metal oxide having an electrochemical redox potential of 0.5 volt to 3 volts versus lithium, and wherein the electrical circuit comprises a switchable component connecting the positive electrode and the negative electrode, wherein the switchable component provides a shunt between the positive electrode and the negative electrode in a first switch position.

Also disclosed is a vehicle comprising: an electric motor; and a battery system connected to the electric motor, wherein the battery system comprises a lithium-ion cell comprising a positive electrode comprising a first metal oxide, an electrolyte, and a negative electrode comprising a second metal oxide having an electrochemical redox potential of 0.5 volt to 3 volts versus lithium, and an electrical circuit comprising a switchable component connecting the positive electrode and the negative electrode, wherein the switchable component provides a shunt between the positive electrode and the negative electrode in a first switch position, and wherein the electrical circuit is configured to provide a voltage of 0.1 volt or less between the positive electrode and the negative electrode for at least 0.001 hour when the switchable component is in the first switch position.

In any of the various embodiments, the battery system may comprise 1 to 50,000 lithium-ion cells; and/or the lithium nickel oxide may have an $\alpha$-NaFeO$_2$ structure; and/or the lithium nickel oxide may be of the formula Li$_x$MO$_2$, wherein M comprises Ni and wherein 0<x<1.2; and/or the lithium metal oxide may comprises a lithium titanium oxide, a lithium niobium oxide, or a combination thereof; and/or the lithium titanium oxide may be of the formula Li$_{4+y}$Ti$_5$O$_{12}$, wherein 0≤y≤3; and/or the lithium titanium oxide may have a spinel structure; and/or wherein the lithium niobium oxide is of the formula Li$_q$M$^4_{1-r}$Nb$_{2+r}$O$_7$, wherein M$^4$ is Ti, Zr, Hf, W, or a combination thereof, 0≤q≤3, and 0≤r≤3; and/or the negative electrode may comprise a current collector, and wherein the current collector does not comprise copper; and/or the current collector may comprise a metal which is electrochemically reactive with lithium at a potential of 0.1 volt to 0.8 volt versus lithium; and/or the current collector may comprise aluminum, titanium, steel, or a combination thereof; and/or the shunt may have a resistance of less than 1 ohm; and/or the electrical circuit may be configured to provide a voltage of 0.1 volt or less between the positive electrode and the negative electrode when the shunt is engaged; and/or the discharging may comprise discharging the battery to 0.1 volt or less; and/or the discharging may comprise discharging at a rate of less than 10 C; and/or the shunting the battery, e.g., providing a shunt between the positive electrode and the negative electrode of the cell, may comprise providing a shunt having a resistance of 0.001 R to 10 R, where R=V/C with V being the voltage of the battery and C being a current which will discharge a fully charged battery in 1 hour, between the positive electrode and the negative electrode of the battery; and/or the shunting the battery may comprise shunting for at least 0.05 hours; and/or the shunting the battery may comprise shunting at a battery temperature of −40° C. to 50° C.

The disclosed embodiment is further illustrated in the following Examples.

EXAMPLES

Example 1

A positive electrode was manufactured by coating a mixture of a lithium nickel oxide (CAM-7, CAMX Power LLC, Lexington, Mass.), acetylene black, and polyvinylidene difluoride (PVDF) in a weight ratio of 94:3:3 on aluminum. A negative electrode was manufactured by coating a mixture of lithium titanium oxide, acetylene black, and PVDF in a weight ratio of 90:3:7 on aluminum. The positive electrode, a separator, and the negative electrode were placed in an aluminum coated polypropylene envelope with the electrode tabs feeding through the package's edge seal, and an electrolyte consisting of 1 M $LiPF_6$ in a mixture of propylene carbonate, ethyl methyl carbonate, and methyl butyrate in a weight ratio of 1:1:2 added before sealing to provide a 1 ampere-hour (Ah) laminate-packaged prismatic cell.

The cell was initially charged to 2.59 V at 200 milliamperes (mA) (C/5) rate. It was then cycled at various rates, after which it was once again charged to 2.59 V. It was then discharged to 0 V at 50 mA (C/20) rate, and subsequently maintained at 0 V by externally short circuiting the cell with a copper wire connected across the cell terminals while being stored in a 45° C. oven for 1 week, after which it was again charged to 2.59 V at C/5 rate.

Figure 6:
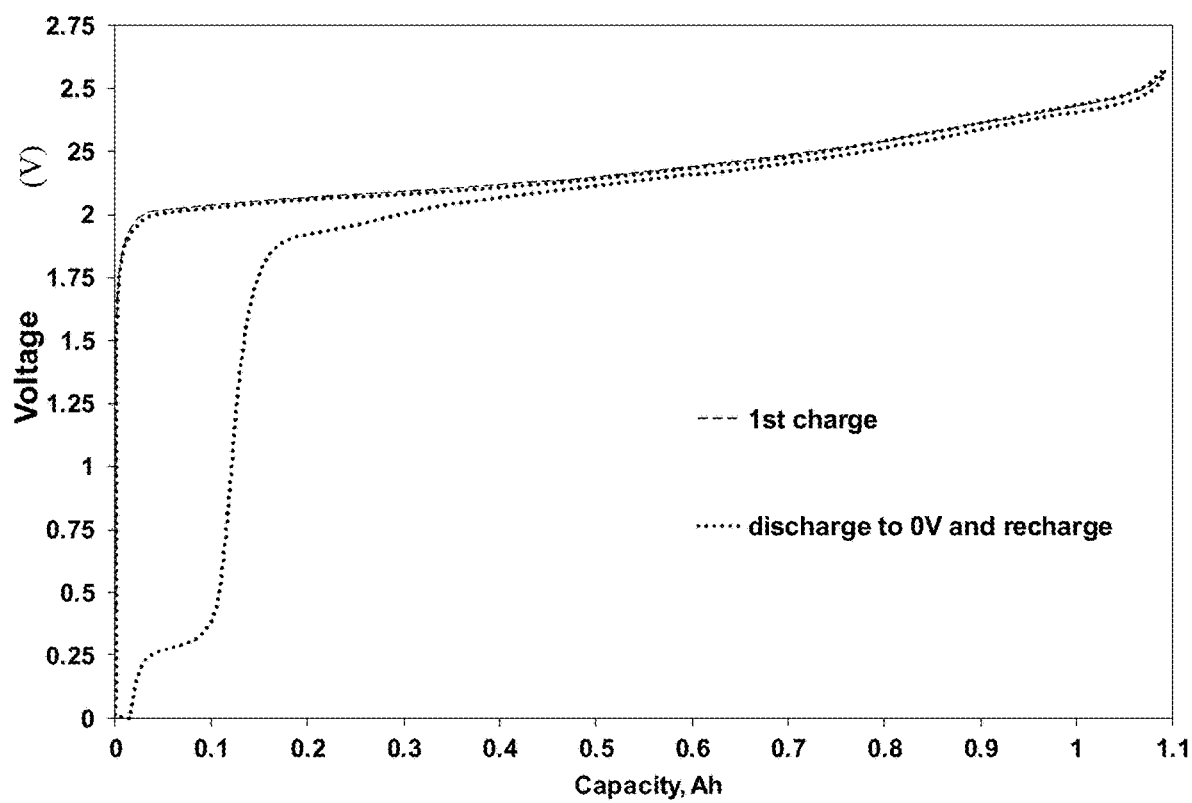
FIG. 6 is a graph of voltage (volts, V) versus capacity (ampere-hours, Ah) for the first charge, a first discharge to 0 V, and second charge cycle of the cell of Example 1.

FIG. 6 is as graph of cell voltage (volts, V) versus capacity (ampere-hours, Ah) which shows the voltage profiles of the first charge and discharge to 0V and the following recharge of the cell after the 1 week of storage at 0V at 45° C. As shown in FIG. 6, the cell voltage when recharging the cell following its discharge to 0V exactly reproduces the voltage on 1st charge of the cell. This reproduction of the first charge shows that there is no true irreversible capacity loss associated with the initial charging and cycling of the cell, and that discharge of the cell to 0 V essentially returns the electrodes to their as-made, uncycled condition.

Example 2

A 3-electrode, 130 mAh laminate-packaged prismatic cell containing a Li metal reference electrode was constructed from stacked positive and negative 1.3 $mAh/cm^2$ electrodes identical to those used in Example 1, i.e., a positive electrode comprising CAM-7 lithium nickel oxide, acetylene black and PVDF in a weight ratio of 94:3:3 on an Al current collector; a negative electrode comprising lithium titanium oxide, acetylene black, and PVDF in a weight ratio of 90:3:7 on an Al current collector, and the same electrolyte formulation as that used in Example 1.

The voltage between the positive electrode and the Li metal reference electrode was monitored as the cell was cycled. The cell was initially charged to 2.59 V at 26 mA (C/5) rate. It was then cycled and pulsed at various rates at ambient and low temperatures to characterize its rate capability, after which it was discharged to 1.31 V. It was then discharged to 0 V at 13 mA (C/10) rate and held at 0 V for 25 hours.

Figure 7:
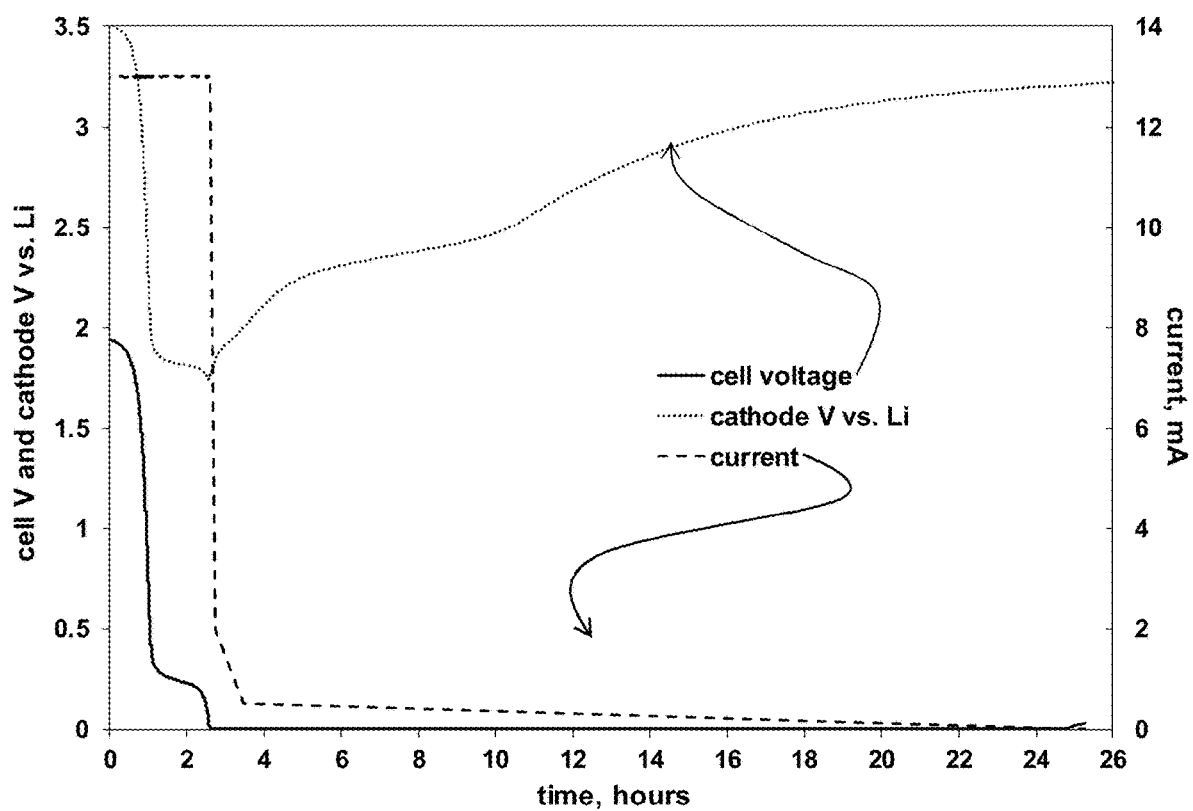
FIG. 7 is a graph of cell voltage (V vs Li/Li+) and cathode voltage (V vs Li/Li+) versus time (hours) for a discharge of the cell of Example 2 to 0 volts.

Shown in FIG. 7 is the voltage and current for the cell, and the potential of the positive electrode (i.e., cathode) vs. reference electrode during discharge of the cell to 0 V. The results shown in FIG. 7 show that as the cell voltage declines to 0.25 V and holds a plateau there, the potential of the positive electrode drops to a plateau at 1.8 V vs. Li. But then, as the cell voltage drops from the 0.25 V plateau, and the cell voltage is then held at 0 V while the cell current declines, the cathode potential rises and stabilizes at 3.2-3.3 V vs. Li.

As is further discussed above, and while not wanting to be bound by theory, it is understood that the potential characteristic displayed by the positive electrode in FIG. 7, arises from the reinsertion of Li ions associated with the "irreversible capacity" of charged lithium nickel oxide electrode materials. As is further discussed above, the recovered "irreversible capacity" is understood to be initially associated with $Li_{1+x}MO_2$ type crystallographic sites, and the excess Li ($Li_x$) in these sites is understood to slowly diffuse into the $Li_{1-x}MO_2$ type crystallographic sites to reoccupy the remaining Li vacancies, resulting in slow recovery of the positive electrode potential to 3 V vs. Li, as shown in FIG. 7.

Example 3

A 2.5 Ah laminate-packaged prismatic cell was constructed from stacked 1.7 $mAh/cm^2$ electrodes having the same formulation as that used in Example 1, i.e., a positive electrode comprising CAM-7 lithium nickel oxide, acetylene black and PVDF in a weight ratio of 94:3:3 on an Al current collector; a negative electrode comprising lithium titanium oxide, acetylene black, and PVDF in a weight ratio of 90:3:7 on an Al current collector, and the same electrolyte formulation as that used in Example 1.

Figure 8:
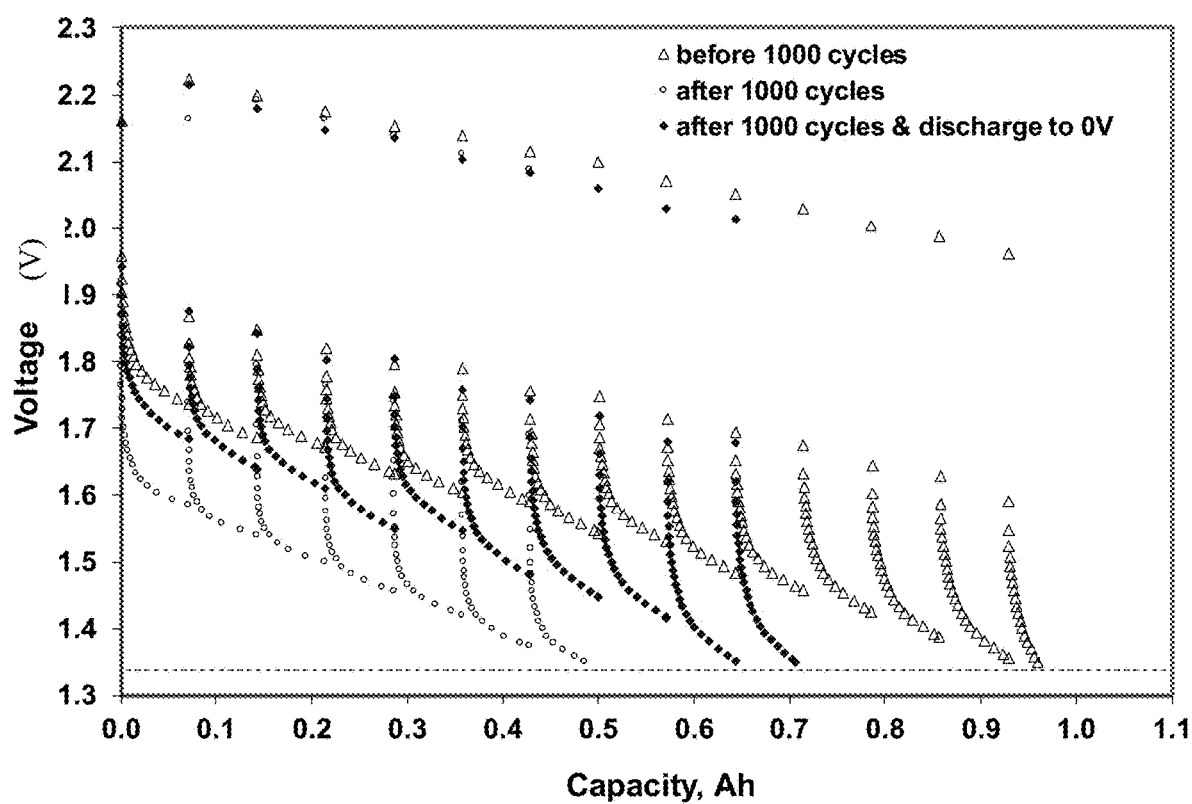
FIG. 8 is a graph of voltage (volts) versus capacity (Ah) showing the results of pulse discharge analysis of the cell of Example 3.

The cell was cycled 1,000 times at room temperature at a 1 C charge and 1 C discharge rate between 2.65 V and 1.40 V, during which the capacity faded only 3% and the impedance grew 8%. However, the low-temperature pulse performance was much more strongly affected by cycling. When the fresh cell was tested at −46° C. by discharging it in 30 second duration discharge pulses at a 3.4 C rate, in accordance with scaled cold cranking requirements of the MIL-PRF-32143B military 6T battery specification and as shown in FIG. 8, it delivered 13 complete pulses totaling 0.95 Ah before reaching the voltage cutoff of 1.35 V. When the same cold cranking test was again performed on the cell after it had completed the 1,000 cycles at room temperature, it could only deliver 6 complete pulses totaling 0.45 Ah, as is also shown in FIG. 8.

The cell was then discharged to 0 V, stored for 5 weeks in the fully discharged state, and retested. After the 0 V discharge and subsequent 5 weeks storage the cell delivered 9 complete pulses totaling 0.65 Ah during the cold cranking test performed at −46° C., as shown in FIG. 8, providing the unexpected result that discharge to 0 V had restored half of the low-temperature performance loss imposed on the cell by extended room temperature cycling. All cycling and cold crank testing was performed on the unfixtured cell (i.e., no external clamping pressure was applied).

Example 4

Figure 9:
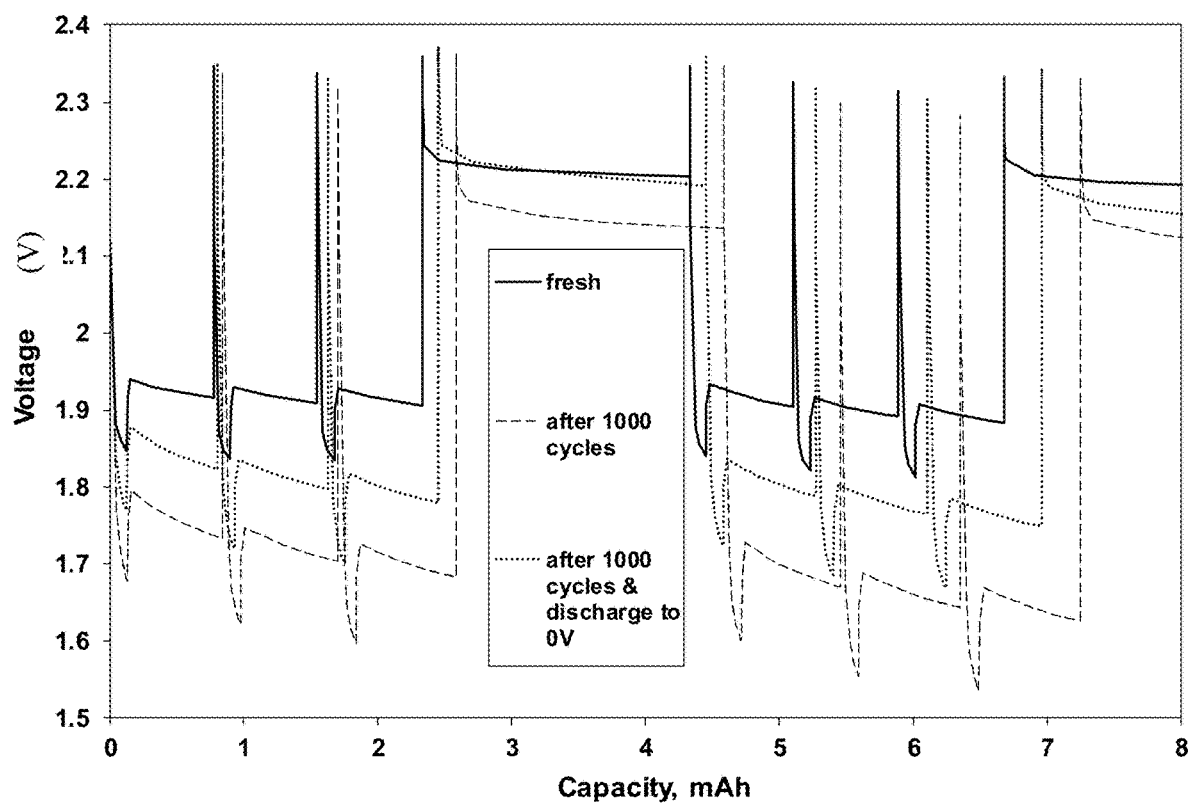
FIG. 9 is a graph of voltage (V) versus capacity (mAh) showing the results of pulse discharge analysis of the cell of Example 4.

A 120 mAh laminate-packaged prismatic cell was constructed from stacked 1.2 mAh/cm² electrodes having the same formulation as that used in Example 1, i.e., a positive electrode comprising CAM-7 lithium nickel oxide, acetylene black and PVDF in a weight ratio of 94:3:3 on an Al current collector; a negative electrode comprising lithium titanium oxide, acetylene black, and PVDF in a weight ratio of 90:3:7 on an Al current collector, and the same electrolyte formulation as that used in Example 1. This cell was tested according to the scaled power and voltage requirements of the Department of Energy (DOE) 12V start/stop vehicle battery test manual. The cold cranking test in the DOE manual calls for 3 consecutive discharge pulses to be applied to the battery, each pulse consisting of 6 kiloWatts (kW) discharge for 0.5 seconds and 4 kW discharge for 4 seconds, with 10 seconds rest between pulses. Appropriately scaled powers for testing this 120 mAh cell were determined to be 1.69 W and 1.13 W for the 6 kW and 4 kW steps, respectively, by modeling the electrode designs in cells designed to fit a full-scale 12 V battery. In this way, the projected total electrode area of a 12 V battery was determined, and the battery's resulting area-specific power densities at 6 kW and 4 kW could be calculated and applied to the 120 mAh cell. After each 3-pulse test sequence, the cell was discharged at 0.5 C rate for 2 minutes, and then allowed to rest for 15 minutes before applying the next pulse sequence, with this process being repeated until cell voltage reached 1.33 V. Scaled start/stop battery cold cranking tests were performed at −30° C. before and after cycling the cell 1,000 times at 45° C., and then again after subsequently discharging the cell to 0 V, with all tests being performed on unfixtured (no clamping) cells. The 45° C. cycling was performed at 10 C charge and 10 C discharge rate (1.2 A) between 2.43 V and 1.33 V, during which the capacity faded by 5%. After cycling, the cell's cold cranking performance was characterized, and then the cell was discharged to 0 V at a 6 mA (C/20) rate, after which the cold cranking performance was again characterized. The low-temperature pulse performance was strongly affected by the 45° C. cycling, but was partially restored by discharging the cycled cell to 0 V. The impacts of cycling and 0 V discharge on the cell are shown by polarization results in FIG. 9. After cycling, cell polarization during cold crank testing was increased by 200 mV relative to the cell polarization during cold crank testing before the cycling, however after 0V discharge this polarization increase was reduced by 50%, so that the cell was polarized only 100 mV more than the cell polarization before the cycling, indicating that discharge to 0 volts significantly reversed the increased polarization that resulted from cycling and high-temperature exposure.

Figure 10:
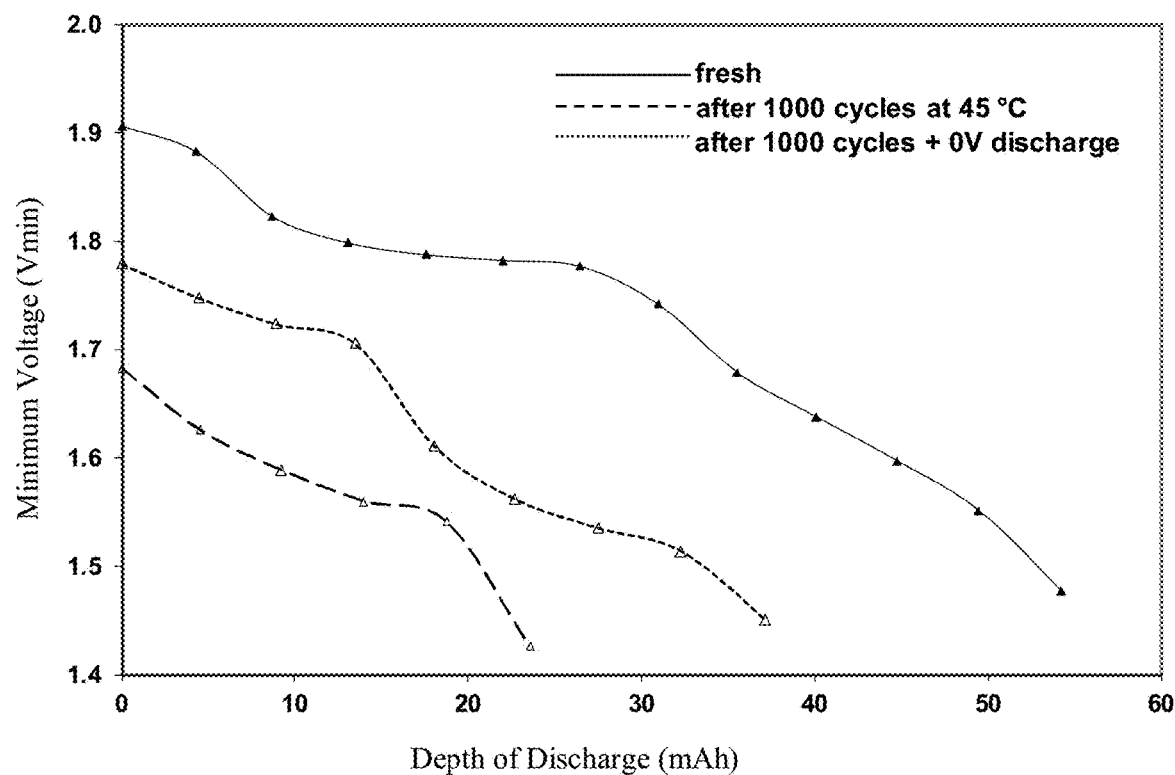
FIG. 10 is a graph of minimum voltage (Vmin) versus depth of discharge (mAh) showing the results of cold cranking voltage analysis for the cell of Example 4.

The cold crank test results for the uncycled (fresh), cycled, and 0V-discharged cell are summarized in FIG. 10, which shows the minimum 4 kW-scaled pulsing voltage for each completed 3 pulse sequence of each cold cranking test. The uncycled cell delivered 13 complete pulse sequences across a 55 mAh depth of discharge range. After 1000 cycles at 45° C., it delivered 6 complete pulse sequences across a 23 mAh depth of discharge range, which increased to 9 complete sequences over a 38 mAh depth of discharge range after the cell had been discharged to 0 V. Thus, if the operational specifications of a start/stop vehicle battery dictate that its usable capacity be limited to the depth of discharge range over which it can meet cold cranking requirements, the ability to maintain or restore its performance by periodic discharge to 0 V could significantly extend its life with respect to meeting usable capacity/energy specifications.

Example 5

A positive electrode will be manufactured by coating a mixture of a lithium nickel oxide (CAM-7, CAMX Power LLC, Lexington, Mass.), acetylene black, and polyvinylidene difluoride (PVDF) in a weight ratio of 94:3:3 on aluminum. A negative electrode will be manufactured by coating a mixture of lithium niobium oxide, acetylene black, and PVDF in a weight ratio of 90:3:7 on aluminum. The positive electrode, a separator, and the negative electrode will be placed in an aluminum coated polypropylene envelope with the electrode tabs feeding through the package's edge seal, and an electrolyte consisting of 1 M LiPF$_6$ in a mixture of propylene carbonate, ethyl methyl carbonate, and methyl butyrate in a weight ratio of 1:1:2 added before sealing to provide a 1 ampere-hour (Ah) laminate-packaged prismatic cell.

The cell will be initially charged to 2.59 V at 200 milliamperes (mA) (C/5) rate. It will then be cycled at various rates, after which it will be discharged to 0 V at 50 mA (C/20) rate, and subsequently maintained at 0 V by externally short circuiting the cell with a copper wire connected across the cell terminals while being stored in a 45° C. oven for 1 week, after which it will again be charged to 2.59 V at C/5 rate.

A graph of cell voltage (volts, V) versus capacity (ampere-hours, Ah), showing the voltage profiles of the first charge and discharge to 0V and the following recharge of the cell after the 1 week of storage at 0 V at 45° C. will show that the cell voltage when recharging the cell following its discharge to 0 V reproduces the voltage on 1st charge of the cell. The reproduction of the first charge will show that there is no true irreversible capacity loss associated with the initial charging and cycling of the cell, and that discharge of the cell to 0 V essentially returns the electrodes to their as-made, uncycled condition.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the scope thereof. Therefore, it is intended that this disclosure not be limited to the particular embodiments disclosed as the best mode contemplated for carrying out this disclosure. It should also be understood that the embodiments disclosed herein should be considered in a descriptive sense only and not for purposes of limitation. Descriptions of features, advantages, or aspects of each embodiment should be considered as available for other similar features, advantages, or aspects of other embodiments.

What is claimed is:

1. A battery system comprising:
   a lithium-ion cell comprising
      a positive electrode comprising a first metal oxide,
      an electrolyte, and
      a negative electrode comprising a second lithium metal oxide having an electrochemical redox potential of 0.5 volt to 3 volts versus lithium; and
   an electrical circuit comprising a switchable component connecting the positive electrode and the negative electrode, wherein the switchable component provides a shunt between the positive electrode and the negative electrode in a first switch position, and
   wherein the electrical circuit is configured to discharge the lithium ion cell to a voltage of 0.1 volt or less between the positive electrode and the negative electrode when the switchable component is in the first switch position.

2. The battery system of claim 1, wherein the battery system comprises 1 to 50,000 lithium-ion cells.

3. The battery system of claim 2,
   wherein the lithium-ion cells are electrically connected and comprise a first cell and a last cell,
   wherein the electrical circuit connects one of a positive electrode and a negative electrode of the first cell and one of a positive electrode and a negative electrode of the last cell, and
   wherein the lithium-ion cells are connected in series, parallel, or a combination thereof.

4. The battery system of claim 1, wherein the first metal oxide comprises a lithium nickel oxide, a lithium cobalt oxide, a lithium manganese oxide, a lithium iron phosphate, or a combination thereof.

5. The battery system of claim 4, wherein the first metal oxide comprises a lithium nickel oxide having a layered structure.

6. The battery system of claim 5, wherein the first metal oxide is of the formula $Li_xMO_2$, wherein M comprises Ni and wherein $0<x<1.2$.

7. The battery system of claim 1, wherein the second metal oxide comprises a titanium oxide, a niobium oxide, a titanium niobium oxide, a lithium titanium oxide, a lithium niobium oxide, lithium titanium niobium oxide, or a combination thereof.

8. The battery system of claim 7, wherein the lithium titanium oxide is of the formula $Li_{4+y}Ti_5O_{12}$, wherein $0 \leq y \leq 3$.

9. The battery system of claim 7, wherein the lithium niobium oxide is of the formula $$Li_qM^4{}_{1-r}Nb_{2+r}O_7$$

wherein $M^4$ is Ti, Zr, Hf, W, or a combination thereof, $0 \leq q \leq 3$, and $0 \leq r \leq 1$.

10. The battery system of claim 1, wherein the negative electrode comprises a current collector, and wherein the current collector comprises a metal, which is electrochemically reactive with lithium at a potential of 0.1 volt to 0.8 volt versus lithium.

11. The battery system of claim 10, wherein the current collector comprises aluminum.

12. The battery system of claim 11, wherein the current collector does not comprise copper.

13. The battery system of claim 1, wherein the shunt has a resistance of 0.001R to 10R, wherein R=V/C, wherein V is a voltage of the battery and C is a current which discharges the battery in 1 hour.

14. The battery system of claim 13, wherein the electrical circuit is configured to provide a voltage of 0.1 volt or less between the positive electrode and the negative electrode when the shunt is engaged for at least 0.001 hour.

15. A method of restoring a battery, the method comprising:
   providing a battery comprising a lithium-ion cell comprising
      a positive electrode comprising a first metal oxide,
      an electrolyte, and
      a negative electrode comprising a second metal oxide having an electrochemical redox potential of 0.5 volt to 3 volts versus lithium;
   discharging the battery to a voltage of 0.1 volt or less; and
   providing a shunt between the positive electrode and the negative electrode of the cell to restore the battery.

16. The method of claim 15, wherein the discharging comprises discharging at a rate of less than 10 C.

17. The method of claim 15, wherein the providing the shunt comprises providing a shunt having a resistance of 0.001R to 10R, where R=V/C with V being a voltage of the battery and C being a current which discharges the battery in 1 hour.

18. The method of claim 17, wherein the providing the shunt comprises providing the shunt and maintaining a voltage of the battery of 0.1 volt or less for at least 0.001 hour.

19. The method of claim 17, wherein the providing the shunt comprises providing the shunt at a battery temperature of −40° C. to 50° C.

20. A method of manufacturing a battery system, the method comprising:
   connecting a lithium-ion cell to an electrical circuit to manufacture the battery,
   wherein the lithium-ion cell comprises
      a positive electrode comprising a first metal oxide,
      an electrolyte, and
      a negative electrode comprising a second metal oxide having an electrochemical redox potential of 0.5 volt to 3 volts versus lithium,
   wherein the electrical circuit comprises a switchable component connecting the positive electrode and the negative electrode, wherein the switchable component provides a shunt between the positive electrode and the negative electrode in a first switch position, and
   wherein the electrical circuit is configured to discharge the battery to a voltage of 0.1 volt or less between the positive electrode and the negative electrode when the switchable component is in the first switch position.

21. A vehicle comprising:
   an electric motor; and
   a battery system connected to the electric motor, wherein the battery system comprises
      a lithium-ion cell comprising
         a positive electrode comprising a first metal oxide,
         an electrolyte, and
         a negative electrode comprising a second metal oxide having an electrochemical redox potential of 0.5 volt to 3 volts versus lithium, and
      an electrical circuit comprising a switchable component connecting the positive electrode and the negative electrode, wherein the switchable component provides a shunt between the positive electrode and the negative electrode in a first switch position, and wherein the electrical circuit is configured to discharge the lithium-ion cell to a voltage of 0.1 volt or less between the positive electrode and the negative electrode when the switchable component is in the first switch position.

\* \* \* \* \*